(12) United States Patent
Kitago et al.

(10) Patent No.: US 9,905,011 B2
(45) Date of Patent: Feb. 27, 2018

(54) APPARATUS, SYSTEM, AND METHOD FOR PROCESSING INFORMATION AND PROGRAM FOR THE SAME

(71) Applicant: CANON KABUSHIKI KAISHA, Tokyo (JP)

(72) Inventors: Masaki Kitago, Tokyo (JP); Toru Fukushima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 5 days.

(21) Appl. No.: 14/900,099

(22) PCT Filed: Jun. 17, 2014

(86) PCT No.: PCT/JP2014/066495
§ 371 (c)(1),
(2) Date: Dec. 18, 2015

(87) PCT Pub. No.: WO2014/204009
PCT Pub. Date: Dec. 24, 2014

(65) Prior Publication Data
US 2016/0148387 A1 May 26, 2016

(30) Foreign Application Priority Data
Jun. 21, 2013 (JP) ................................. 2013-130856

(51) Int. Cl.
G06T 7/00 (2017.01)
G06T 7/571 (2017.01)
(Continued)

(52) U.S. Cl.
CPC ............. *G06T 7/0069* (2013.01); *G06T 7/557* (2017.01); *G06T 7/571* (2017.01); *G06T 7/593* (2017.01);
(Continued)

(58) Field of Classification Search
CPC ....... G06T 7/0069; G06T 7/557; G06T 7/593; G06T 7/571; H04N 13/0271;
(Continued)

(56) References Cited

U.S. PATENT DOCUMENTS 6,262,738 B1 7/2001 Gibson
7,911,496 B2 3/2011 Sawachi
(Continued)

FOREIGN PATENT DOCUMENTS

CN 102278946 A 12/2011
CN 102572469 A 7/2012
(Continued)

*Primary Examiner* — Amandeep Saini
(74) *Attorney, Agent, or Firm* — Canon U.S.A., Inc. IP Division

(57) ABSTRACT

An information processing apparatus that acquires distance information from image data includes an input unit 162 and a procedure selection unit 164. The input unit 162 inputs image data and information associated with the image data and specifying a procedure for deriving distance information. The procedure selection unit 164 selects at least one from a plurality of procedures on the basis of the information specifying a procedure for acquiring distance information and derives distance information from the image data using the selected procedure.

21 Claims, 19 Drawing Sheets

(51) Int. Cl.
*G06T 7/593* (2017.01)
*G06T 7/557* (2017.01)
*H04N 13/00* (2018.01)
*H04N 13/02* (2006.01)

(52) U.S. Cl.
CPC ..... *H04N 13/0235* (2013.01); *H04N 13/0271* (2013.01); *H04N 13/0048* (2013.01); *H04N 13/0066* (2013.01); *H04N 13/0242* (2013.01); *H04N 2013/0081* (2013.01)

(58) Field of Classification Search
CPC ........... H04N 13/0235; H04N 13/0066; H04N 13/0242; H04N 13/0048; H04N 2013/0081
USPC ......................................................... 382/106
See application file for complete search history.

(56) References Cited

U.S. PATENT DOCUMENTS

| | | | |
|---|---|---|---|
| 2002/0186216 A1* | 12/2002 | Baumberg | G06T 17/10 345/422 |
| 2009/0195640 A1 | 8/2009 | Kim et al. | |
| 2011/0063409 A1 | 3/2011 | Hannuksela | |
| 2011/0187831 A1 | 8/2011 | Kim et al. | |
| 2011/0249117 A1* | 10/2011 | Yoshihama | H04N 13/0239 348/135 |
| 2012/0148109 A1 | 6/2012 | Kawamura | |
| 2012/0293627 A1 | 11/2012 | Ishii | |
| 2013/0063566 A1 | 3/2013 | Morgan-Mar et al. | |

FOREIGN PATENT DOCUMENTS

| | | |
|---|---|---|
| CN | 102598682 A | 7/2012 |
| EP | 1617684 A1 | 1/2006 |
| JP | 2001059934 A | 3/2001 |
| JP | 2003-070720 A | 3/2003 |
| JP | 2012-253444 A | 12/2012 |
| JP | 2013-25649 A | 2/2013 |
| JP | 2013-62803 A | 4/2013 |
| KR | 20090084259 A | 8/2009 |
| KR | 20100007895 A | 1/2010 |
| WO | 2012137434 A1 | 10/2012 |
| WO | 2013038679 A1 | 3/2013 |

* cited by examiner

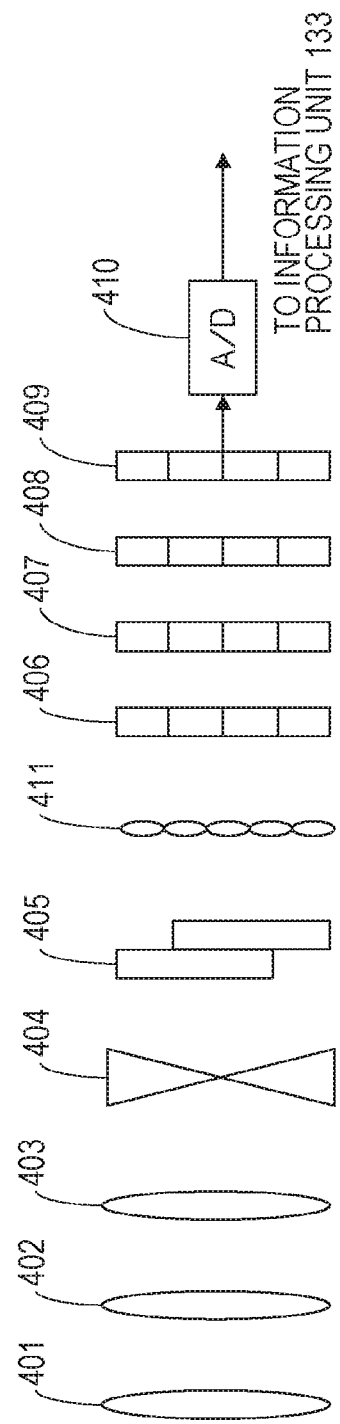

| PARAMETER NAME | TAG ID | DATA FORMAT | DATA COUNT | VALUE |
|---|---|---|---|---|
| Format Version | 9991 | 0003 | 00000002 | 0002 0000 |
| Format Type | 9992 | 0004 | 00000001 | 00000000 |
| Depth Method | 9993 | 0004 | 00000001 | 00000001 |
| Image Used | 9994 | 0004 | 00000004 | 00000000<br>00000000<br>00000001<br>00000000 |
| Number of Viewpoints X | 9995 | 0004 | 00000001 | 00000002 |
| Number of Viewpoints Y | 9996 | 0004 | 00000001 | 00000002 |
| Representative Image | 9997 | 0004 | 00000002 | 00000000<br>00000000 |
| Viewpoint Offset | 9998 | 0004 | 00000002 | 00001000<br>00002000 |

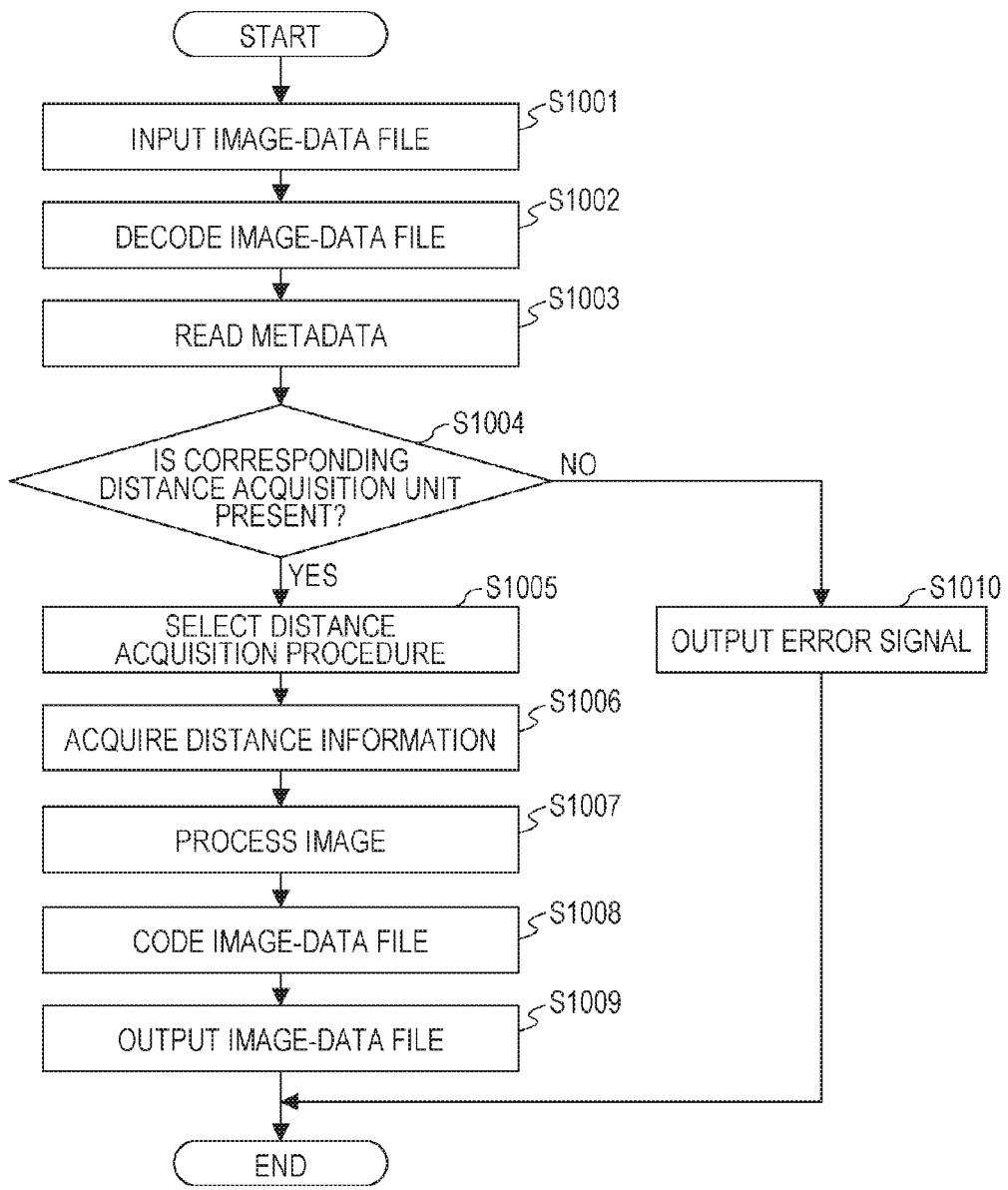

PLENOPTIC IMAGE

APPARATUS, SYSTEM, AND METHOD FOR PROCESSING INFORMATION AND PROGRAM FOR THE SAME

TECHNICAL FIELD

The present invention relates to an information processing apparatus for acquiring distance information from image data.

BACKGROUND ART

In the area of digital cameras, a known technique in the related art provides computational photography for extracting image data on a subject and further information from the output of an image sensor and applying the information to image processing. An example is the process of acquiring information on a distance to a subject from image data acquired by a digital camera.

A known method for acquiring distance information from image data is a stereo matching method based on the correlation among a plurality of image data having parallax (PTL 1). Another known method is a method for acquiring distance information on the basis of the difference in in-focus state among a plurality of images in different in-focus states (PTL 2).

Since the above distance-information acquisition processes require complicated calculation, a method of executing the processes using, not a camera, but an external device, during acquisition of image data is conceivable.

However, this method is not convenient because the process for acquiring distance information differs depending on the kind of input image data, which needs dedicated processing software and hardware for the individual image data.

CITATION LIST

Patent Literature

PTL 1 Japanese Patent Laid-Open No. 2012-253444
PTL 2 Japanese Patent Laid-Open No. 2013-62803

SUMMARY OF INVENTION

The present invention increases convenience for the process of obtaining distance information from image data.

The present invention provides an information processing apparatus including an input unit configured to input image data for deriving distance information and information associated with the image data and specifying a procedure for deriving distance information; a selection unit configured to select at least one from a plurality of procedures for deriving distance information on the basis of the information specifying a procedure; and a derivation unit configured to derive distance information from the image data using a procedure selected by the selection unit.

Further features of the present invention will become apparent from the following description of exemplary embodiments with reference to the attached drawings.

BRIEF DESCRIPTION OF DRAWINGS

FIG. 4 is a diagram showing an example configuration of an image capturing unit of a camera of the first embodiment of the present invention.

FIG. 9A is a diagram of a description example of management data in CPI data.

FIG. 9B is a diagram showing the correspondence relationship between tag information and parameters.

FIG. 10 is a flowchart showing a process performed in a computer of the first embodiment of the present invention.

DESCRIPTION OF EMBODIMENTS

First Embodiment

A first embodiment is applied to an information processing system for obtaining information on the distance of a subject from image data acquired by a digital camera and for performing image processing on the acquired image data on the basis of the distance information.

Figure 1:
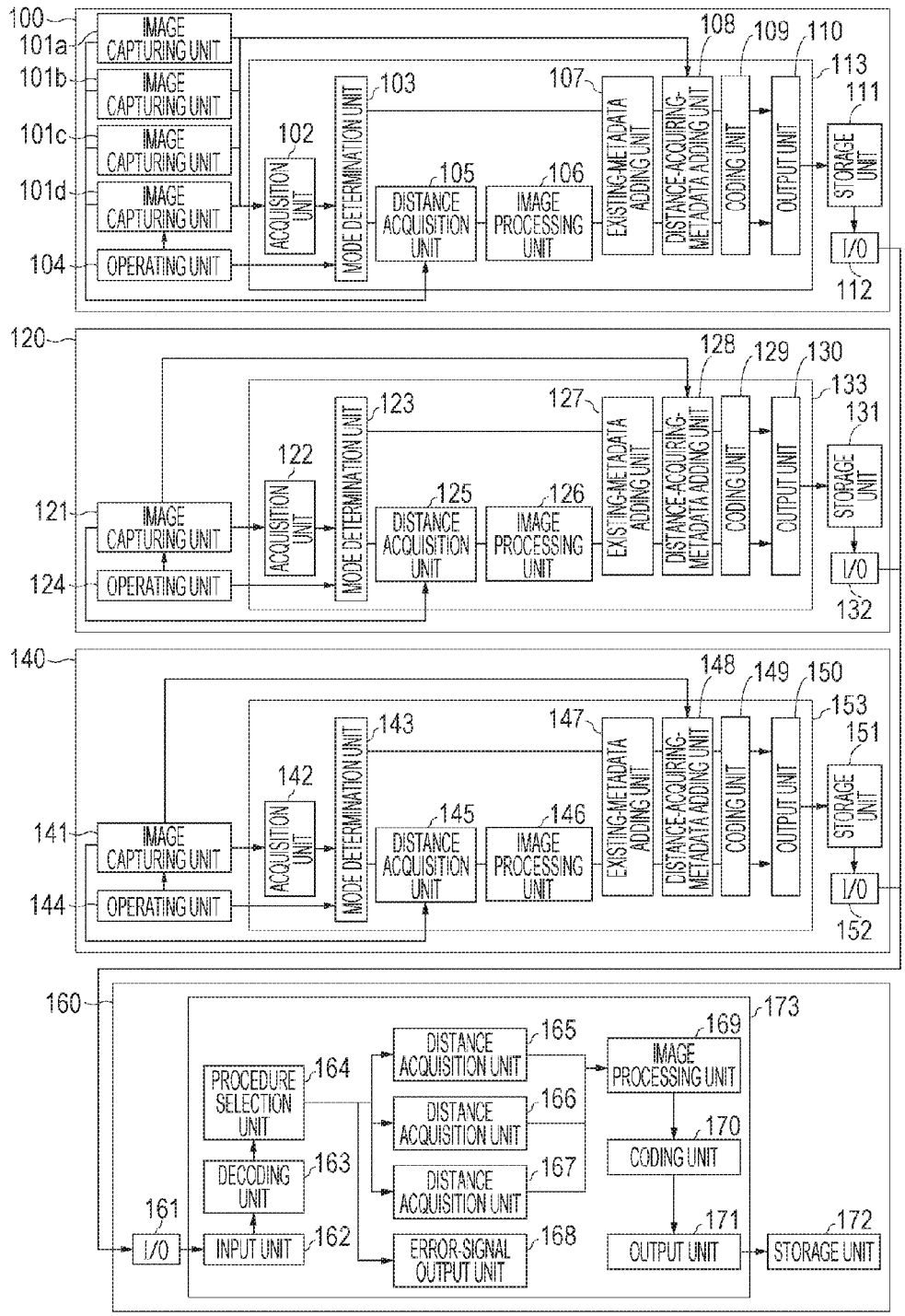
FIG. 1 is a diagram showing the configuration of an image processing system according to a first embodiment of the present invention.

FIG. 1 is a diagram showing the configuration of a first embodiment.

An information processing system of this embodiment is configured by connecting cameras 100, 120, and 140 to a computer 160.

The camera 100 includes an image capturing unit 101, an information processing unit 113, an operating unit 104, and a storage unit 111. The camera 100 is connected to the computer 160 via an I/O interface 112.

Figure 2A:
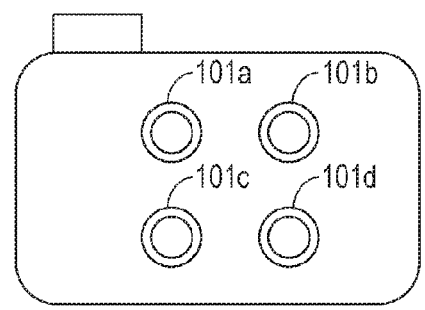
FIG. 2A is a diagram showing the appearance of a camera of the first embodiment of the present invention

FIG. 2A shows the appearance of the camera 100. As shown in FIG. 2A, the camera 100 includes four image capturing units 101a to 101d and can acquire images from a plurality of viewpoints.

Figure 2B:
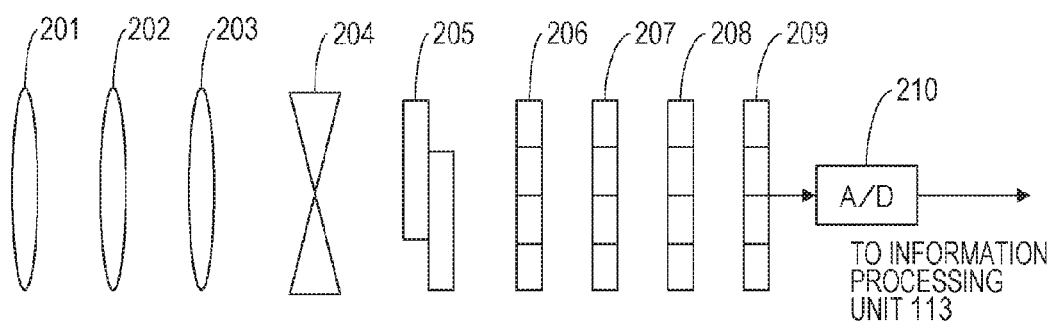
FIG. 2B is a diagram showing an example configuration of an image capturing unit of the camera of the first embodiment.

FIG. 2B shows the internal configuration of the image capturing unit 101a. The image capturing units 101b to 101d have the same configuration as that of the image capturing unit 101a.

The image capturing unit 101a includes imaging lenses 201 to 203, an aperture stop 204 (hereinafter simply referred to as an aperture), a shutter 205, an optical low-pass filter 206, an infrared cut-off (IR) filter 207, a color filter 208, an image sensor 209, and an A-D conversion unit 210. The imaging lenses 201 to 203 are a zoom lens 201 and focus lenses 202 and 203, respectively. A user can adjust the amount of light to be introduced into the image capturing unit 101 by adjusting the aperture 204. Examples of the image sensor 209 include light-receiving elements, such as a CMOS and a CCD. When the amount of light of the subject is detected by the image sensor 209, the detected amount is converted to a digital value by the A-D conversion unit 210 and is output as digital data to the information processing unit 113.

Figure 3:
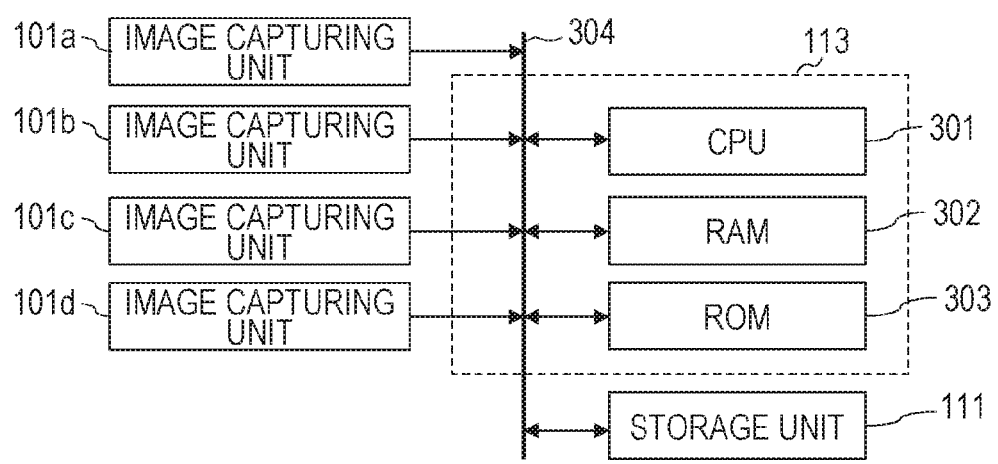
FIG. 3 is a diagram showing the hardware configuration of an information processing unit of the first embodiment of the present invention.

FIG. 3 is a diagram showing the internal configuration of the information processing unit 113. The information processing unit 113 includes a CPU 301, a RAM 302, and a ROM 303, which are mutually connected by a system bus 304.

The CPU 301 is a processor that controls the components in the camera 100 as a whole. The RAM 302 functions as main memory or a work area for the CPU 301. The ROM 303 stores a program shown in a flowchart in FIG. 7. The information processing unit 113 implements the functions of the components shown in FIG. 1 by the CPU 301 reading the program stored in the ROM 303 as a program code and executing it. The information processing unit 113 may include dedicated processing circuits serving as the components shown in FIG. 1, in addition to the above.

Examples of the operating unit 104 include input devices provided on the camera main body, such as a button, a dial, and a touch panel, with which the user can enter instructions to start or stop image-acquisition, to set conditions for image-acquisition, and so on. In this embodiment, the user can set an internal processing mode in which acquisition of distance information and image processing are performed in the camera during image-acquisition and an external processing mode in which they are performed after image data is output to an external unit.

The storage unit 111 is a non-volatile storage medium, such as a memory card, in which image data acquired by the image capturing unit 101 can be stored.

The I/O interface 112 can use serial bus connection implemented by a universal serial bus (USB) and has a corresponding USB connector (not shown). Of course, LAN connection using an optical fiber or wireless connection may be used.

Next, the configurations of the cameras 120 and 140 will be described. Although the configurations of the cameras 120 and 140 are basically the same as that of the camera 100, the structures of the image capturing units and the processes performed by the distance acquisition units differ. The distance acquisition units of the cameras 100, 120, and 140 perform the processes shown in FIGS. 11, 14, and 15, respectively. The details thereof will be described later.

The camera 120 is a plenoptic camera. An image acquired by a plenoptic camera includes information on multiple viewpoints. In this embodiment, an image acquired by a plenoptic camera is referred to as a plenoptic image.

FIG. 4 is a diagram showing the internal configuration of an image capturing unit 121. The image capturing unit 121 includes a zoom lens 401, focus lenses 402 and 403, an aperture 404, a shutter 405, an optical low-pass filter 406, an IR cut-off filter 407, a color filter 408, an image sensor 409 and ad an A-D conversion unit 410. Although the image capturing unit 121 has a similar configuration to that of the image capturing unit 101a in the above point, it further includes a microlens array 411 in which a plurality of tiny convex lenses are arrayed. Assuming that the imaging lenses 401 to 403 are a single lens, the microlens array 411 is disposed on an image plane of the virtual lens. Disposing the microlens array 411 in the image plane of the virtual lens allows the incident direction of light introduced into the image sensor 409 to be differentiated.

Figure 5A:
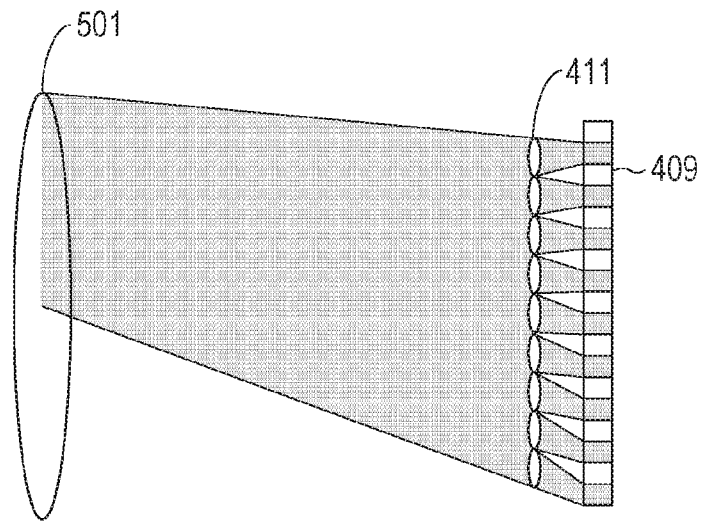
FIGS. 5A and 5B are diagrams illustrating a method for differentiating light with a plenoptic camera.
Figure 5B:
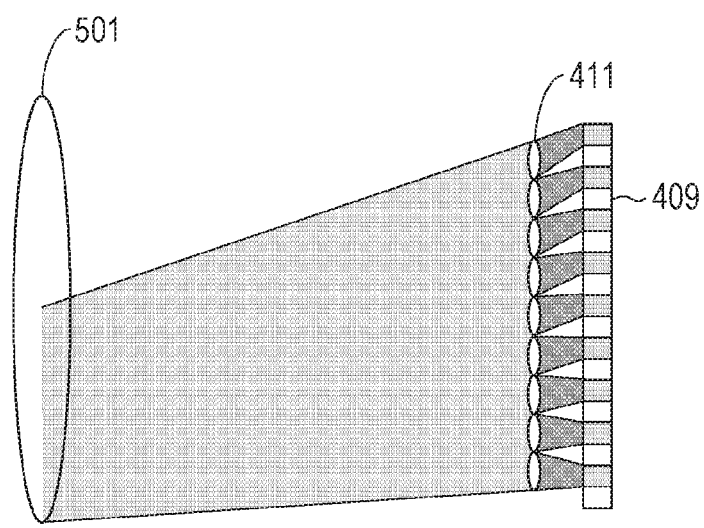

FIGS. 5A and 5B are diagrams illustrating a state in which light exiting from a virtual lens 501 is differentiated by the microlens array 411. The light exiting from the upper half of the virtual lens 501 and the light exiting from the lower half of the virtual lens 501 irradiate different pixel areas of the image sensor 409. Selectively extracting information of the pixel areas allows information of multiple viewpoints to be extracted from the plenoptic image.

The camera 140 has a depth-from-defocus (DFD) function and can acquire a plurality of images in different in-focus states. Here, "different in-focus states" means that the degree of blurring of a subject image differs depending on the lens position, the focal length, and the depth of field. The details of DFD will be described later.

Figure 6:
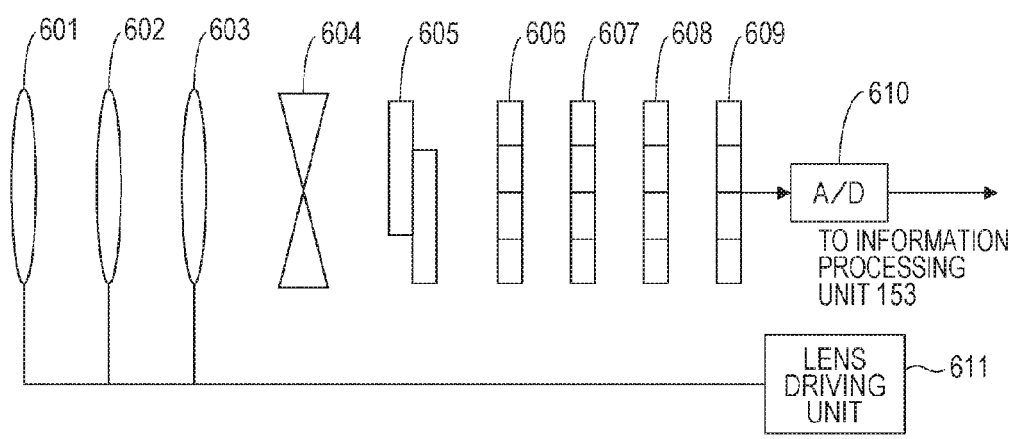
FIG. 6 is a diagram showing an example configuration of an image capturing unit of a camera of the first embodiment of the present invention.

FIG. 6 is a diagram illustrating the internal configuration of an image capturing unit 141. Although the basic configuration is the same as that of the image capturing unit 101a, the image capturing unit 141 further includes a lens driving unit 611 and thus can adjust the in-focus position by driving imaging lenses 601 to 603. The camera 140 can acquire a plurality of images in different in-focus positions by acquiring images before and after the lenses 601 to 603 are driven.

Next, the configuration of the computer 160 will be described. The computer 160 includes an I/O interface 161, an information processing unit 173, and a storage unit 172. Like the I/O interface 112, the I/O interface 161 has a USB connector. The computer 160 is connected to the cameras 100, 120, and 140 via the I/O interface 161.

The internal configuration of the information processing unit 173 is the same as that of the information processing unit 113 shown in FIG. 3. A ROM in the information processing unit 173 stores a program shown in a flowchart in FIG. 10.

The storage unit 172 is a non-volatile storage medium, such as a hard disk, which can store, for example, image data output from the cameras 100, 120, and 140 and image data that is newly generated in the computer 160.

A process performed by the information processing system of this embodiment will be described hereinbelow. The details of a distance-information acquisition process, and image processing will be described later.

Figure 7:
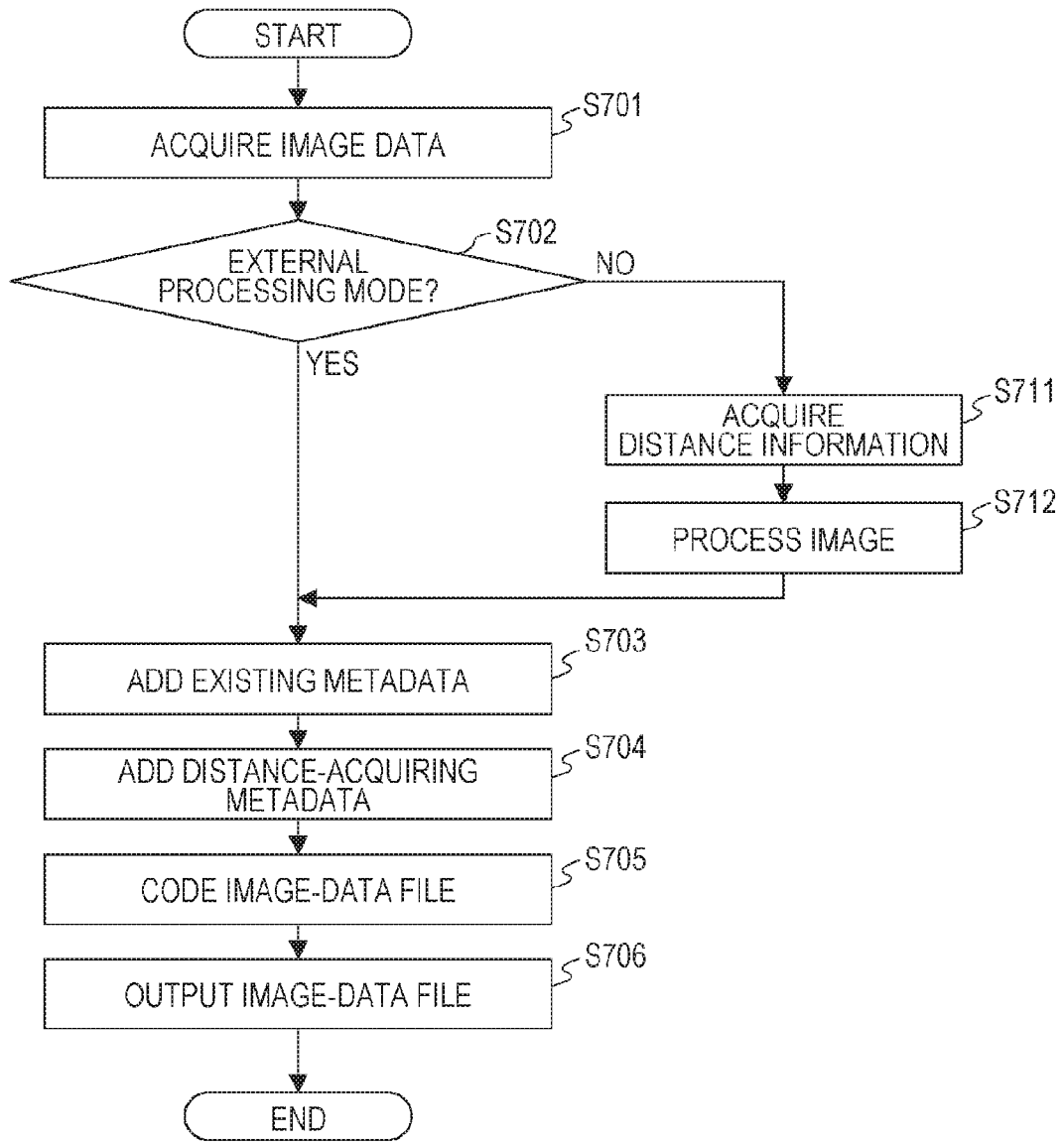
FIG. 7 is a flowchart of a process performed in the camera of the first embodiment of the present invention.

FIG. 7 is a flowchart of a process performed in the camera 100 when a mode for performing image processing based on distance information on acquired image data is set.

First, an acquisition unit 102 acquires image data output from the image capturing unit 101 and outputs the image data to a mode determination unit 103 (step S701).

Next, the mode determination unit 103 determines a process mode set by the operation of the operating unit 104 on the basis of an instruction signal from the operating unit 104 (step S702). If the process mode is determined to be the external processing mode, the mode determination unit 103 outputs the image data to an existing-metadata adding unit 107 and goes to the process of step S703. If the process mode is determined to be the internal processing mode, the mode determination unit 103 outputs the image data to a distance acquisition unit 105 and goes to the process of step S711.

If the process mode is determined to be the internal processing mode, the distance acquisition unit 105 acquires information on the distance of the subject using the input image data and outputs the input image data and the acquired distance information in association with each other to an image processing unit 106 (step S711). In this embodiment, distance information that the distance acquisition unit 105 acquires is a distance map showing distances at individual position in the subject. The distance map shows distances in two dimensions from the camera to the subject at individual pixel positions and is output as bitmap data. Here, examples of association include outputting image data and distance information as sequence data and temporarily storing information indicating the relationship between image data and distance information in the RAM 302 so that the CPU 301 can read the information and interpret it. The distance map does not need to show correct distances to the subject; for example, rough information indicating relative distances, such as "foreground", "middle ground", and "background", may be added for individual areas of the subject.

Next, the image processing unit 106 performs image processing on the input image data on the basis of the distance map associated with the input image data (step S712). The image processing unit 106 further associates the image data generated by image processing with the input image data and outputs the associated image data to the existing-metadata adding unit 107.

Next, the existing-metadata adding unit 107 adds metadata defined in an existing standard file format to the input image data and outputs the image data to a distance-acquiring-metadata adding unit 108 (step S703). This allows the user to open an output file to check an image even with software that does not support the file format of this embodiment. The existing metadata to be added is defined in a tagged image file format (TIFF) or Exif, which are existing standard file formats, and includes image-acquisition parameters for one of a plurality of items of input image data. In this embodiment, this includes image acquisition parameters of image data acquired by the image capturing unit 101a. The format of the metadata to be added is not limited to TIFF and Exif but may be a format defined in another standard file format. The existing metadata to be added may be metadata of image data acquired by an image capturing unit other than the image capturing unit 101a.

Next, the distance-acquiring-metadata adding unit 108 adds metadata for use in obtaining distance information from input image data to the image data and outputs it as an image-data file 801 to a coding unit 109 (step S704).

Figure 8:
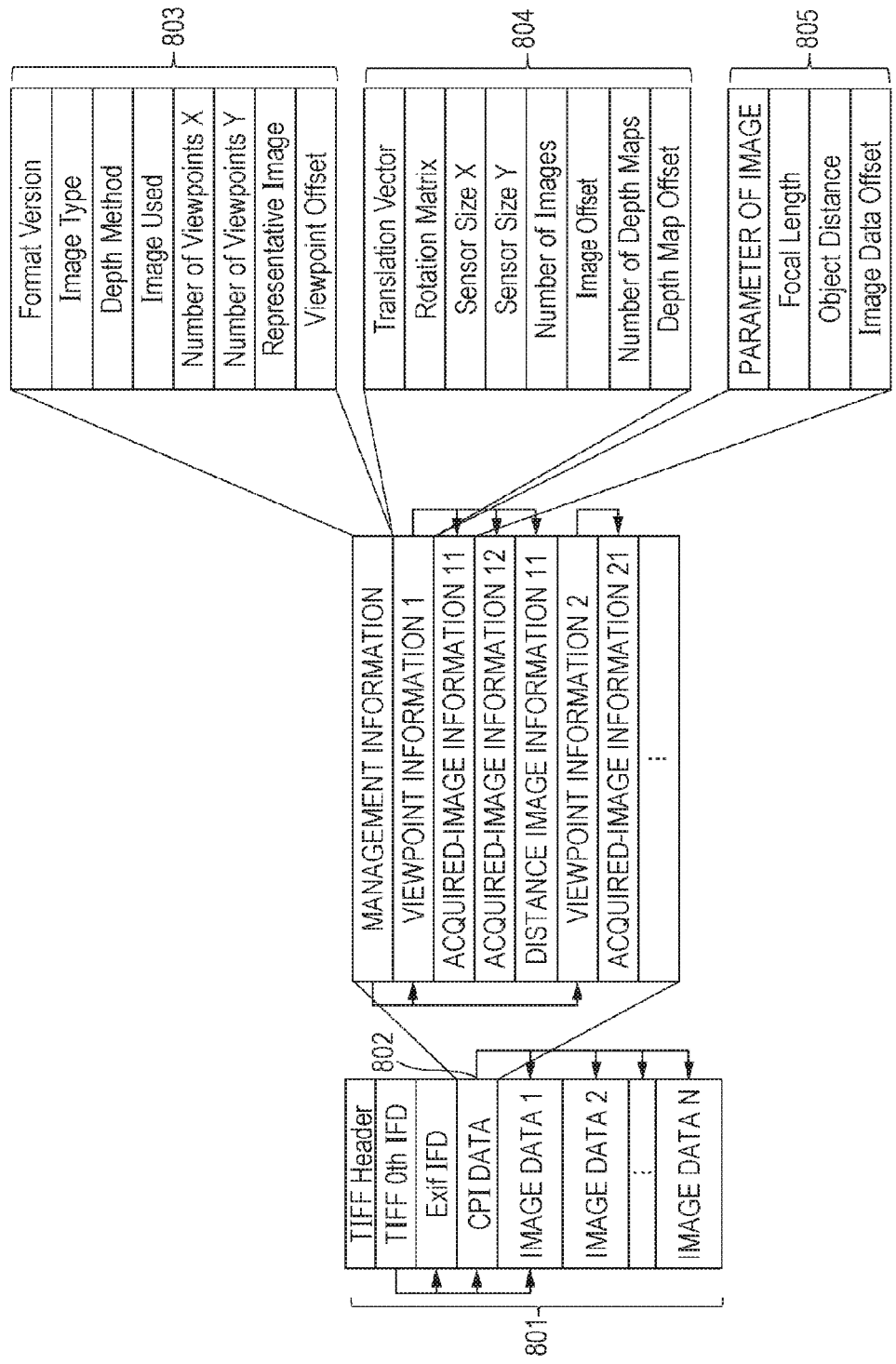
FIG. 8 is a diagram showing an example of the structure of an image-data file of the first embodiment of the present invention.

The structure of the image-data file 801 will be described hereinbelow. FIG. 8 is a diagram showing the data structure of the image-data file 801 of this embodiment. The file format of this embodiment allows both image data acquired from a plurality of viewpoints and image data acquired in a plurality of in-focus states to be stored. TIFF Header, TIFF 0th IFD, and Exif IFD are metadata defined in TIFF and Exif, which are existing standard file formats. These metadata are added to the image data by the existing-metadata adding unit in step S703. Computational imaging (CPI) data 802 includes parameters for managing individual image data included in the image-data file 801. The CPI data 802 further includes parameters for use in obtaining distance information from image data included in the image-data file 801. The metadata for use in obtaining distance information in this embodiment is CPI data 802. The distance-acquiring-metadata adding unit 108 adds the CPI data 802 to the image data.

The CPI data 802 basically includes management information 803, viewpoint information 804, and image information 805. The CPI data 802, the management information 803, the viewpoint information 804, and the image information 805 are provided with sufficient data areas in advance so that addition and correction of information can be freely performed.

The management information 803 includes information for managing the image-data file 801.

Image Type is a parameter indicating the kind of acquired image data in the image-data file 801. If the acquired image data is plenoptic image data, 1 is input, otherwise 0 is set. The acquired image data refers to image data obtained by image-acquisition using a camera.

Depth Method is a parameter indicating a procedure for use in obtaining distance information. If distance information is obtained on the basis of the parallax of multiview images, 1 is input; if distance information is obtained on the basis of the parallax of multiview information in plenoptic image data, 2 is input; and if distance information is obtained using a DFD method, 3 is input. If distance information is already present, and no further distance information is needed, 0 is input.

Image Used is the number of image data for use in obtaining distance information, which is input in order of the number of a viewpoint and the number of image data in the viewpoint. In this format, the individual items of image data are given the number of a viewpoint at which the image data is acquired and a number indicating the ordinal position of the image data acquired at the viewpoint. For example, image data acquired third at the first viewpoint is given viewpoint number 1 and image-data number 3 in the viewpoint. Thus, if image data with viewpoint number 1 and image-data number 1 and image data with viewpoint number 2 and image-data number 1 are used, four values, 1, 1, 2, and 1 are input to Image Used. If the acquired image data is plenoptic image data, and Depth Method is 2, the viewpoint number of the plenoptic image data used and the image-data number in the viewpoint are described. In this case, a parameter indicating a viewpoint for use in obtaining distance information is added from a plurality of viewpoints included in the plenoptic image data.

Number of Viewpoints X and Number of Viewpoints Y are parameters indicating the numbers of viewpoints in the horizontal direction and the vertical direction included in the image-data file 801, respectively. In this embodiment, both of them are 2.

Representative Image is a parameter indicating the number of typical image data in the plurality of items of image data included in the image-data file 801. Like Image Used, the number of representative image data is input in the order of a viewpoint number and the number of image data in the viewpoint.

Viewpoint Offset is a pointer to each viewpoint information. The start address of each viewpoint information is input as a value.

The viewpoint information 804 includes information on viewpoints corresponding to individual image data included in the image file format.

Translation Vector is the position vector of the viewpoint, to which three-dimensional spatial coordinates if the coordinates of a reference viewpoint (a viewpoint at which a standard representative image is included) is (0, 0, 0) is input in millimeter. The use of the parameter allows the parallax between viewpoints to be obtained. In other words, this parameter includes information on the parallax of a plurality of items of image data included in the image-data file 801. Since this embodiment assumes that the four image capturing units 101*a* to 101*d* are present in the same plane, all components perpendicular to the plane are 0.

Rotation Matrix is a three-dimensional rotation matrix indicating the direction of the viewpoint. A value based on a rotation angle with respect to three orthogonal rotation axes is input to Rotation Matrix.

Sensor Size X and Sensor Size Y are the sizes of the image sensor in the horizontal and vertical directions, which are input in millimeter.

Number of Images is a parameter indicating the number of images acquired from the viewpoint. For example, if two images are acquired form the viewpoint, 2 is input to Number of Images.

Image Offset is a pointer to information on each image acquired at the viewpoint. A start address for each acquired image information is input as a value.

Number of Depth Maps is the number of distance maps corresponding to the viewpoint included in the image-data file 801. If the external processing mode is selected, a distance map has not yet been obtained at this point of time, 0 is input in this embodiment.

Depth Map Offset is a pointer to distance map information corresponding to the viewpoint, which takes a value of a start address for the distance map information. The distance map information includes information on a distance map included in the image-data file 801. Although the basic configuration of the distance map information is the same as that of the image information 805, described later, a parameter for quantization of the distance map is added.

The image information 805 includes information on image data corresponding to individual viewpoints.

First, the beginning of the image information 805 describes a general image parameter defined in, for example, TIFF. For example, it describes the size, resolution, and number of bits per pixel of the image.

Focal Length is the focal length of the imaging lens when the image is acquired, which is input in millimeter.

Object Distance is the position of a focal plane of the subject, calculated from the position and the focal length of the imaging lens, which is input in millimeter. The difference in in-focus state among a plurality of items of image data included in the image-data file 801 can be obtained from the difference in Focal Length and Object Distance described above. In other words, Focal Length and Object Distance includes information on the difference in in-focus state of a plurality of items of image data included in the image-data file 801.

Image Data Offset is a pointer to actual data on each image and takes the value of a start address for the actual data on the image data.

The image-data file 801 can include generated-image-data information in addition to the above information. The generated-image-data information includes information on image data generated by, for example, processing acquired image data. Although the basic configuration of the generated-image-data information is same as that of the image information 805, a parameter indicating that it is generated image data, a parameter indicating the number of original image data, and so on are added.

Figures 9A, 9B:
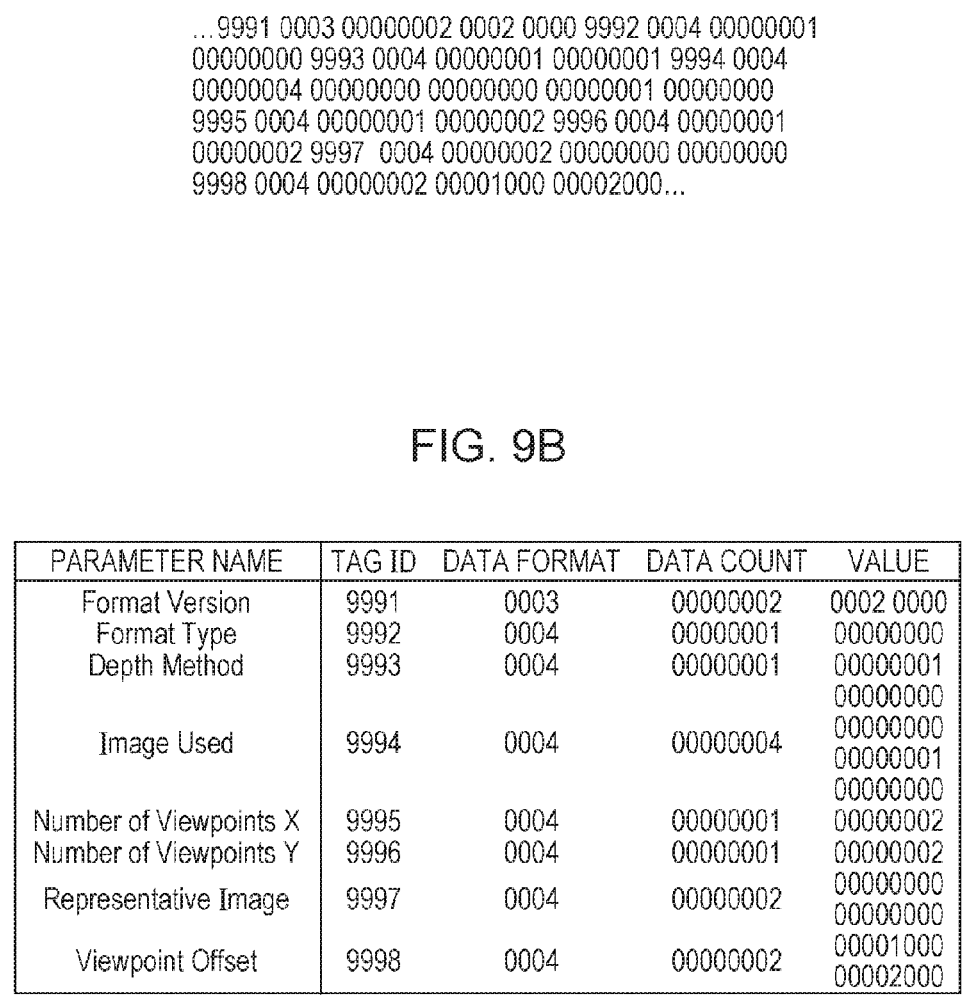

FIG. 9A shows a description example of management data in the CPI data 802. Of course, the form of description of the CPI data 802 is not limited to this example. The management data in this description example includes 2-byte tag information, 2-byte data-format information, 4-byte data-count information, and a data value in order in hexadecimal notation. FIG. 9B is a diagram showing the correspondence relationship between tag information and parameters. The individual parameters in the CPI data 802 are recognized on the basis of the tag information. The data-format information corresponds to data formats in which individual numerals are set in advance. In this embodiment, 3 corresponds to short type (2-byte short integer), and 4 corresponds to long type (4-byte long integer). The distance-acquiring-metadata adding unit 108 adds such data to the image data and outputs it as the image-data file 801 to the coding unit 109.

Next, the coding unit 109 codes the input image-data file 801 (step S705). The coding may be performed by single-view image coding, such as JPEG or PNG, or multiview image coding, such as multiview video coding (MVC) for each image data. The coding unit 109 outputs the coded image-data file 801 to an output unit 110.

The output unit 110 outputs the coded image-data file 801 to the storage unit 111 for storage (step S706).

This is the process performed in the camera 100. Although processes performed in the cameras 120 and 140 are basically the same as that of the camera 100, processes performed by distance acquisition units 125 and 145 differ (step S711). For the camera 110, step S711 corresponds to the flowchart of FIG. 11; for the camera 120, step S711 corresponds to the flowchart of FIG. 14; and for the camera 140, step S711 corresponds to the flowchart in FIG. 15, the details of which will be described later.

Next, a process performed in the computer 160 will be described. FIG. 10 is a flowchart showing the process performed in the computer 160.

First, an input unit 162 receives the image-data file 801 for external processing stored in the storage units 111, 131, and 151 via the I/O interface 161 and inputs it to a decoding unit 163 (step S1001).

Next, the decoding unit 163 decodes the image-data file 801 input by the input unit 162 (step S1002).

Next, a procedure selection unit 164 reads metadata included in the decoded image-data file 801 (step S1003).

Next, the procedure selection unit 164 determines whether the information processing unit 173 has a distance acquisition unit corresponding to the input image data on the basis of information specifying a distance acquisition procedure included in the read metadata (step S1004). In this embodiment, it is determined on the basis of the value of Depth Method in the CPI data 802. If Depth Method is not 1, 2, or 3, the information processing unit 173 does not have a distance acquisition unit corresponding to the image data, and thus, the process goes to step S1010. In step S1010, an error-signal output unit 168 outputs an error signal to a notification section (not shown), the notification section notifies the user of the error, and the information processing unit 173 exits the process. If the information processing unit 173 has a corresponding distance acquisition unit, the process goes to step S1005.

Next, the procedure selection unit 164 selects a distance acquisition procedure corresponding to the information described in the metadata included in the image-data file 801 and outputs the image-data file 801 to the distance acquisition unit corresponding to the procedure (step S1005). In this embodiment, if Depth Method is 1, the image data is output to a distance acquisition unit 165, if Depth Method is 2, the image data is output to a distance acquisition unit 166, and if Depth Method is 3, the image data is output to a distance acquisition unit 167. The determination is made on the basis of a look-up table, stored in the information processing unit 173, in which the correspondence relationship between Depth Method and distance acquisition units is shown. Here, the distance acquisition units 165 to 167 are configured as a plurality of processing modules in identical software. This configuration allows single software to cope with various items of image data, thus increasing the convenience. Of course, the distance acquisition units 165 to 167 may be configured as a plurality of processing circuits in a single processing unit.

The corresponding distance acquisition unit acquires distance information from the image data included in the image-data file 801, and the acquired distance information is further associated with the input image-data file 801 and is output to an image processing unit 169 (step S1006). The acquired distance information is added to the image-data file 801 in association with the viewpoint of the image that is used to obtain distance information. In other words, the image data of the acquired distance map is newly added to the image-data file 801, and Number of Depth Maps and Depth Map Offset of viewpoint information on the viewpoint that is used to obtain distance information are updated. If the process of obtaining the distance on the basis of the parallax of image data with different viewpoints is performed, the obtained distance information is associated with the viewpoint of a standard image among images used to obtain the distance information. The standard image is an image in which viewpoint number and image number are described first, among a plurality of images indicated by Image Used. The standard image may be specified by another method, for example, by adding metadata indicating the number of the standard image. It is also possible to extract the target image data to be processed and to output only the extracted image data and the obtained distance information to the image processing unit 169 as a single file, without adding distance information to the image-data file 801.

Next, the image processing unit 169 processes image data included in the image-data file 801 using the obtained distance information to generate processed image data and outputs the image data to a coding unit 170 in association with the image-data file 801 (step S1007). This image processing is performed by the image processing unit 169 irrespective of the procedure used to obtain distance information with the individual distance acquisition units 165 to 167. The image processing unit 169 is a single processing module in the same software as that of the distance acquisition units 165 to 167. This eliminates the need for preparing a plurality of processing units depending on the kind of input image data, thus decreasing the data size of the software. Of course, another image processing unit for separate image processing may be prepared. Here, the image processing unit 169 processes the standard image used to obtain distance information with reference to Image Used. The image to be processed is not limited to the standard image; for example, an image indicated by Representative Image may be used. New metadata indicating a target image to be processed may be added for each kind of image processing, and an image indicated by the metadata may be used. If only one image is included in the input file, the image is subjected to image processing.

Next, the coding unit 170 codes the image-data file 801 input from the image processing unit 169 and outputs the coded image-data file 801 to an output unit 171 (step S1008).

Lastly, the output unit 171 outputs the coded image-data file 801 to the storage unit 172 (step S1009).

This is the flow of the process performed in the computer 160. The details of the distance-information acquisition process (step S711) performed in the cameras 100, 120, and 140 and the computer 160 will be described. The process in step S711 differ from one distance acquisition unit to another.

First, a process performed by the distance acquisition unit 105 will be described.

Figure 11:
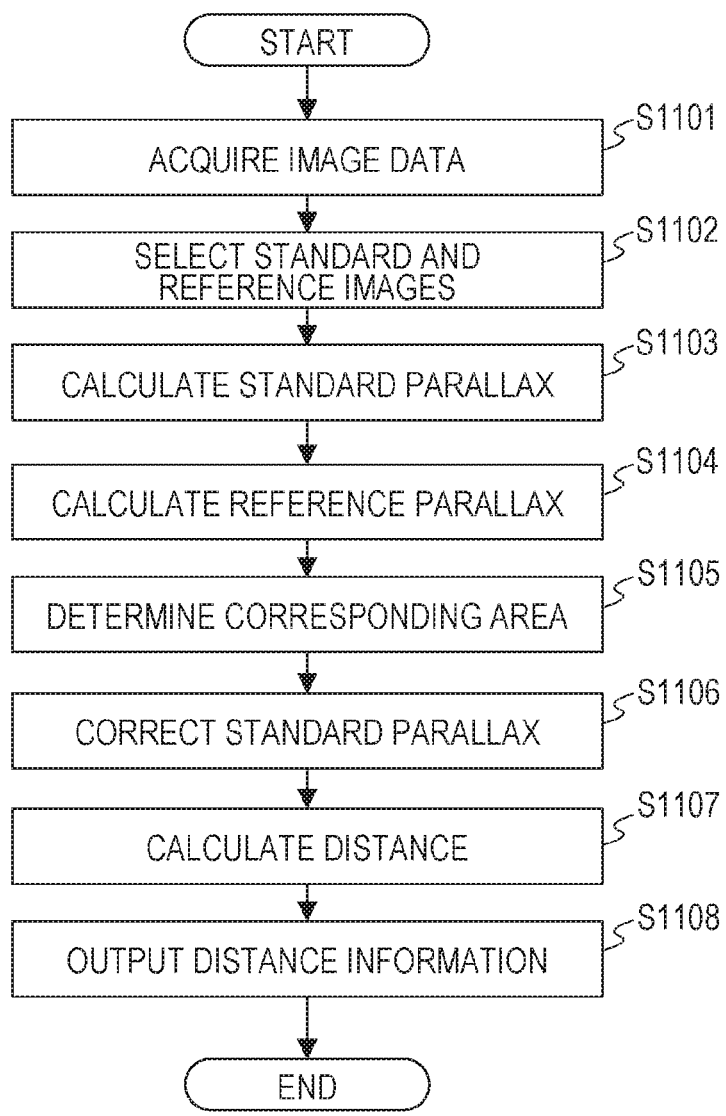
FIG. 11 is a flowchart of a distance-information acquisition process according to the first embodiment of the present invention.

The distance acquisition unit 105 obtains distance information on the basis of the parallax of multiview images acquired by the image capturing units 101*a* to 101*d*. FIG. 11 is a flowchart showing the details of a process performed by the distance acquisition unit 105.

First, the distance acquisition unit 105 acquires multiview image data input from the mode determination unit 103 (step S1101).

Next, the distance acquisition unit 105 selects a standard image serving as a standard for acquiring distance information and a reference image to be referred to to obtain distance information from the input multiview image data (step S1102). In this embodiment, an image described first in Image Used is the standard image, and an image described next is the reference image.

Next, the distance acquisition unit 105 calculates the parallax between the standard image and the reference image (step S1103). This is referred to as a standard parallax. The standard parallax is calculated by searching for a point at which the standard image and the reference image correspond to each other. A point corresponding to point A in the standard image is searched for in the reference image, and the difference in the x coordinate in the image between point A' recognized as a corresponding point and point A is obtained as a parallax. The search for a corresponding point is performed for all the pixels to calculate the standard parallax.

There are various methods for searching for a corresponding point. An example is a method of searching for a corresponding point area by area to find a parallax at which the cost value (color difference) is the smallest. Another example is a method of searching for a corresponding point pixel by pixel to calculate a cost value and smoothing the calculated cost using an edge-preserving filter to find a parallax at which the cost value is the smallest.

Next, the distance acquisition unit 105 calculates the parallax between the reference image and the standard image (step S1104). This is referred to as a reference parallax. The reference parallax is calculated by the same method as that for the standard parallax. Here, a corresponding point is searched for with reference to the reference image, and thus, point B' corresponding to point B in the reference image is searched for from the standard image.

Next, the distance acquisition unit 105 compares the standard parallax obtained in step S1103 and the reference parallax obtained in step S1104 pixel by pixel to determine a corresponding area and a non-corresponding area for the parallax (step S1105). Here, the corresponding area is an area in which the difference between the standard parallax and the reference parallax is equal to or less than a threshold value and in which the reliability of the parallax is high, and the non-corresponding area is an area in which the difference between the standard parallax and the reference parallax is greater than the threshold value and in which the reliability of the parallax is low. For example, if the subject image includes a repeated pattern or an occlusion area, the reliability of the area tends to be low.

Next, the distance acquisition unit 105 corrects the standard parallax of the non-corresponding area determined in step S1105 (step S1106). Since the non-corresponding area has low reliability in parallax, as described above, the standard parallax of the non-corresponding area is corrected by interpolation with the standard parallax of a surrounding high-reliability corresponding area.

Figure 12:
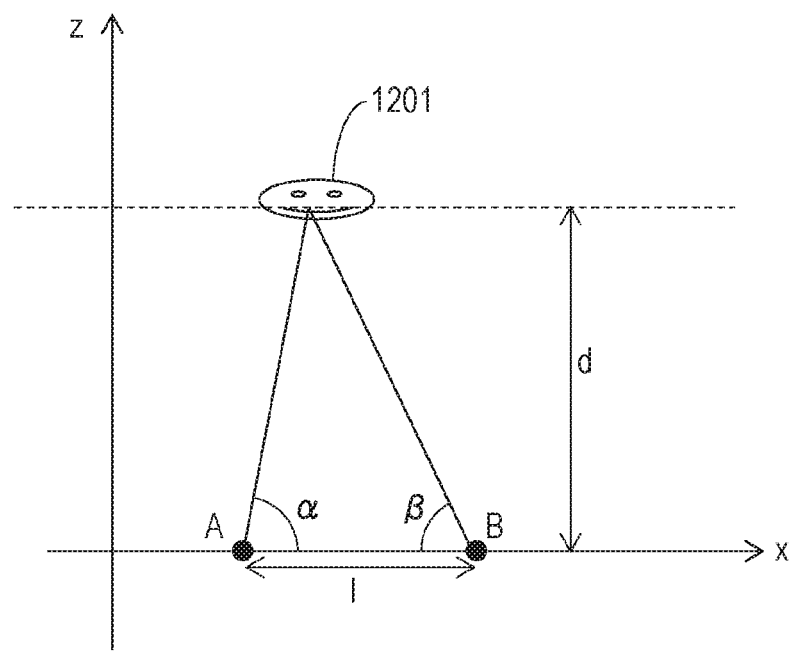
FIG. 12 is a diagram illustrating a procedure for calculating distance using a stereo method.

Next, the distance acquisition unit 105 calculates a distance from the standard parallax to the subject (step S1107). The distance from the standard parallax is calculated by a stereo method. FIG. 12 is a diagram illustrating a procedure for calculating the distance using the stereo method. A distance d from a plane having a viewpoint A and a viewpoint B to an object 1201 is calculated using Eq. 1 on the basis of angles α and β and a base length l.

[Math. 1]

$$d = \frac{l \cdot \sin\alpha \cdot \sin\beta}{\sin(\pi - \alpha - \beta)} \quad \text{Eq. 1}$$

In this embodiment, the angles α and β are determined on the basis of the angles of view of the image capturing units that acquire images at individual viewpoints and the standard parallax obtained in step S1106. The angles of view of the individual image capturing units are calculated from the values of Sensor Size and Focal Length included in the CPI data 802. The base length l is calculated from the values of Translation Vector of the individual viewpoints included in the CPI data 802.

Lastly, the distance acquisition unit 105 generates a distance map on the basis of the distance calculated in step S1107 and outputs it (step S1108). The calculated distance is linearly quantized in 8 bits and is output as bitmap data indicating the distances at individual positions in the subject.

This is the process performed by the distance acquisition unit 105. Of course, the process performed by the distance acquisition unit 105 is not limited to the method described in this embodiment; any other method using reference images at a plurality of viewpoints generated from multiview image data may be used.

Figure 14:
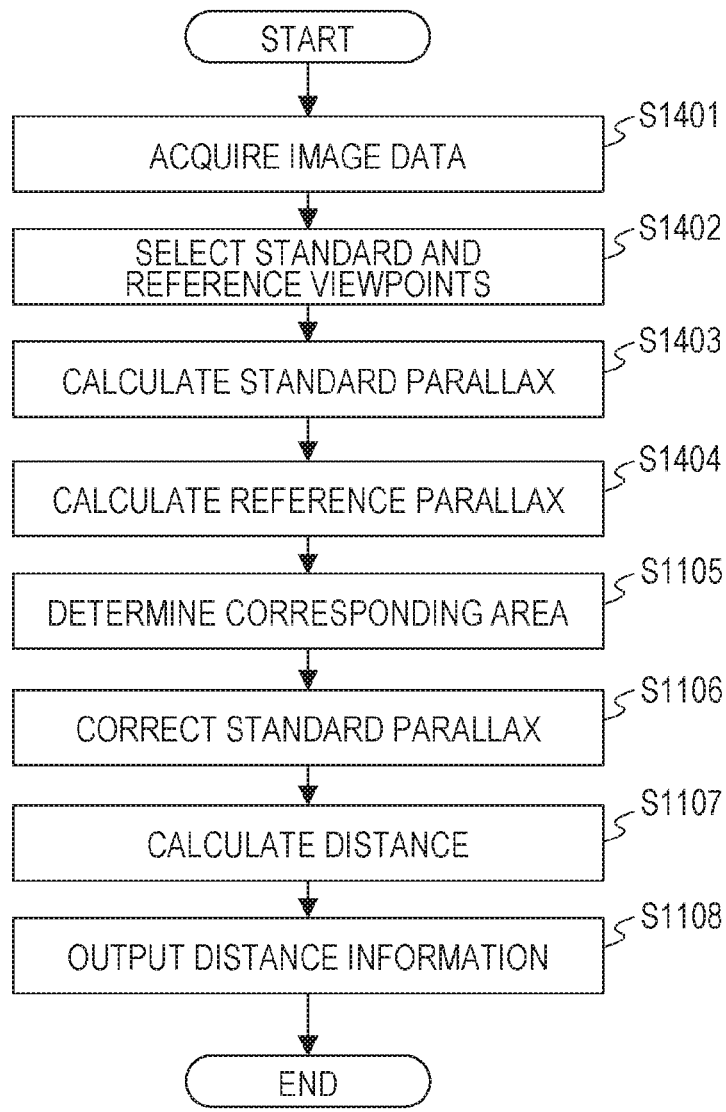
FIG. 14 is a flowchart of a distance-information acquisition process according to the first embodiment of the present invention.

Next, a process performed by the distance acquisition unit 125 will be described. FIG. 14 is a flowchart showing the process of the distance acquisition unit 125.

The distance acquisition unit 125 obtains distance information on the basis of the parallax of multiview images as the distance acquisition unit 105 does but differs in process from the distance acquisition unit 105 because image data input from the camera 120 is a single plenoptic image data item. For example, although the distance acquisition unit 105 searches for a corresponding point from two images, the standard image and the reference image, the distance acquisition unit 125 searches for a corresponding point in a single plenoptic image.

Figure 13A:
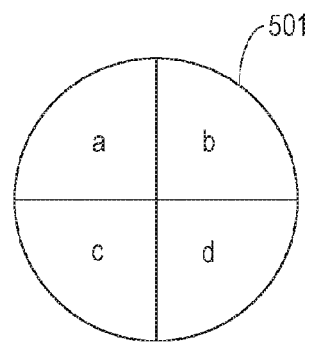
FIGS. 13A and 13B are diagrams showing an example of a plenoptic image.

A method for searching for a corresponding point in a plenoptic image will be described using FIGS. 13A and 13B. The plenoptic image includes extractable information on light that has passed through a plurality of virtual divided areas of a main lens, as shown in FIG. 13A. In this embodiment, the main lens is the virtual lens 501 when the imaging lenses 401 to 403 are assumed to be a single lens.

Figure 13B:
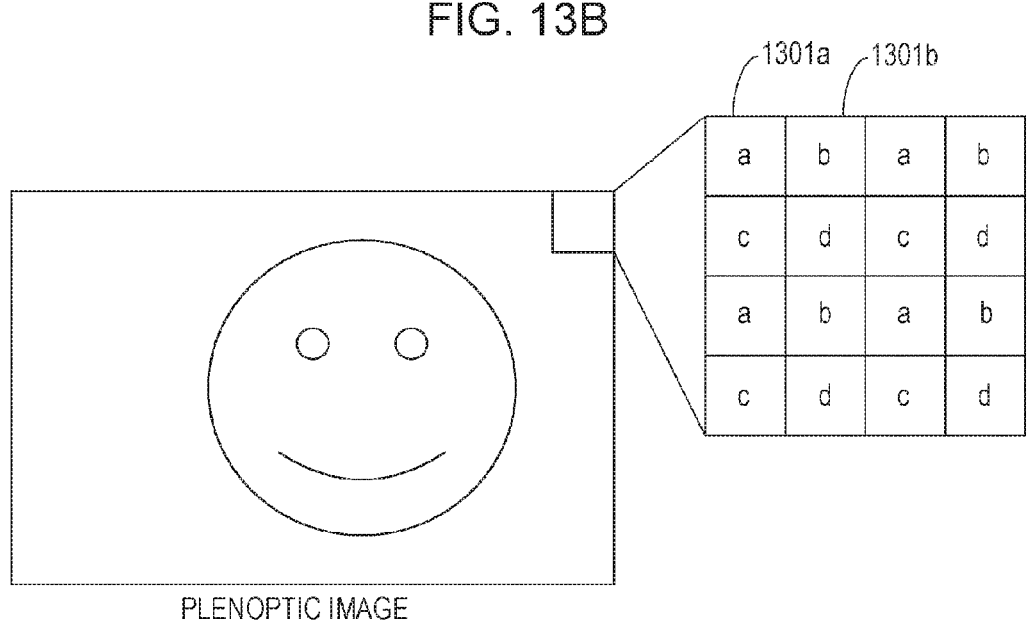

As shown in FIG. 13B, light that has passed through an area a of the main lens enters a pixel group 1301a, and light that has passed through an area b of the main lens enters a pixel group 1301b on the sensor. In other words, the output of the pixel group 1301a includes information on a viewpoint corresponding to the lens area a, and the output of the pixel group 1301b includes information on a viewpoint corresponding to the lens area b.

Thus, when the parallax between two viewpoints is to be determined by corresponding-point search, the output of the pixel group 1301a is replaced with the standard image, and the output of the pixel group 1301b is replaced with the reference image, and the same process as that of the distance acquisition unit 105 may be performed.

An actual process performed by the distance acquisition unit 125 will be described. FIG. 14 is a flowchart showing the process of the distance acquisition unit 125.

First, the distance acquisition unit 125 acquires input plenoptic image data (step S1401).

Next, the distance acquisition unit 125 selects a standard viewpoint serving as a standard for acquiring distance information and a reference viewpoint to be referred to acquire distance information from the input plenoptic image data (step S1402). In this embodiment, a viewpoint described first in Image Used is the standard viewpoint, and a viewpoint described next is the reference viewpoint.

Next, the distance acquisition unit 125 calculates a standard parallax (step S1403). Unlike step S1103, the standard parallax is calculated by searching for a corresponding point in a standard pixel group and a reference pixel group.

Next, the distance acquisition unit 125 calculates a reference parallax (step S1404). Unlike step S1104, the reference parallax is calculated by searching for a corresponding point in the reference pixel group and the standard pixel group.

Thereafter, the process from steps S1105 to S1108 is performed, and the process ends. This is the process performed by the distance acquisition unit 125.

Next, a process performed by the distance acquisition unit 145 will be described. The distance acquisition unit 145 uses a depth from defocus (DFD) method for acquiring distance information on the subject on the basis of the difference in in-focus state between two images. The method for obtaining distance information using the DFD method will be described hereinbelow.

Suppose that an object at distance D1 is projected to an image plane position d1. At that time, an image i1 expands with a blur. The image i1 can be expressed by convolution of a point spread function PSF1 and a scene s at that time.

[Math. 2]

$$i1 = PSF1 \otimes s \quad \text{Eq. 2}$$

where, modeling PSF using a circle of confusion as a parameter and estimating PSF from the image i1 allows the circle of confusion to be calculated. Furthermore, an imaging position can be obtained from the circle of confusion, so that the distance can be calculated by Eq. 2.

However, since the scene s is unknown in Eq. 2, a correct circle of confusion cannot be obtained. Thus, an image is acquired at a different image plane position d2. This image is referred to as i2.

Fourier transforms of the images i1 and i2 are expressed as OTF1×S and OTF2×S, respectively, where S is a Fourier transform of the scene s, OTF1 is an optical transfer function (OTF) of a Fourier transform of PSF1 of the first acquired image, and OTF2 is an OTF of the second acquired image. Then, the ratio between the two images is expressed as:

[Math. 3]

$$\frac{\mathcal{F}\{i2\}}{\mathcal{F}\{i1\}} = \frac{\mathcal{F}\{PSF2 \otimes s\}}{\mathcal{F}\{PSF1 \otimes s\}} = \frac{OTF2 \cdot S}{OTF1 \cdot S} = \frac{OTF2}{OTF1} = OTFr \quad \text{Eq. 3}$$

Thus, the ratio OTFr that does not depend on the scene is calculated. Using a table showing the relationship between OTFr and distance information and functions allows distance information on the subject to be acquired on the basis of the calculated OTFr.

Figure 15:
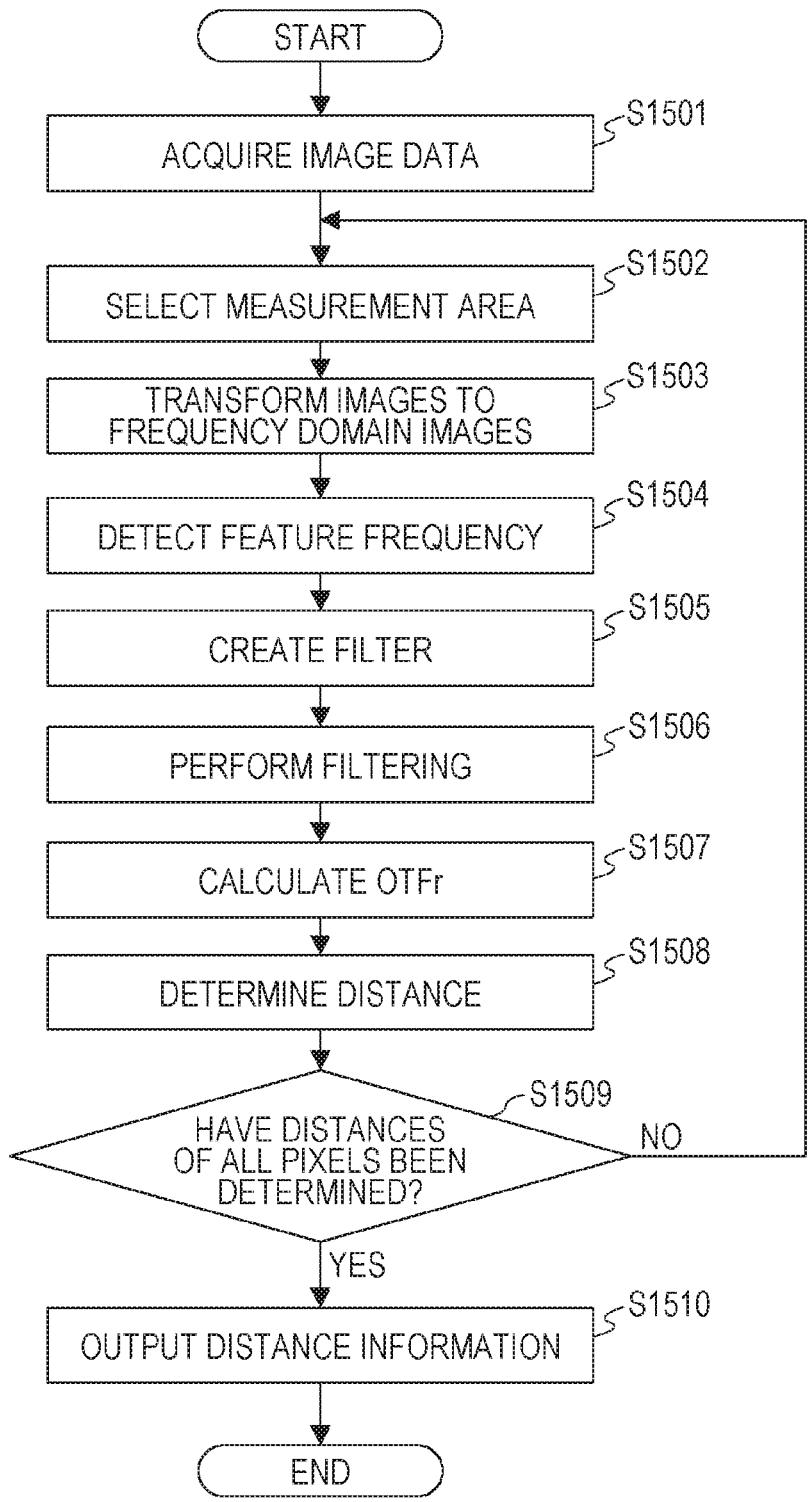
FIG. 15 is a flowchart of a distance-information acquisition process according to the first embodiment of the present invention.

Next, an actual process performed in the distance acquisition unit 145 in this embodiment will be described. FIG. 15 is a flowchart showing the process of the distance acquisition unit 145.

First, the distance acquisition unit 145 acquires two items of image data I1 and I2 input from the mode determination unit 143 (step S1501). The distance acquisition unit 145 performs the distance acquisition process pixel by pixel on all pixels using the two items of image data I1 and I2. Of course, there is no need to perform the distance acquisition process on all the pixels; it may be performed every several pixels, or alternatively, only on predetermined pixels. Furthermore, the target area of the distance acquisition process does not need to be one pixel; an area composed of a plurality of pixels may be subjected to the distance acquisition process. The number of items of image data for use in distance acquisition is not limited to two; three or more items of image data may be used for distance acquisition.

Next, the distance acquisition unit 145 determines measurement pixels by scanning the X-Y coordinates in the image and cuts peripheral pixels necessary for distance acquisition (step S1502). At that time, it is generally necessary to cut the same area in two items of acquired image data I1 and I2. The cut images (an image area including the target pixels and their surrounding pixels) are referred to as selected-area images C1 and C2, respectively. The size of the areas to be cut can be small to reduce the processing time and can be large to some extent to reduce the influence of noise to derive a stable solution. The size of the areas to be cut also depends on the size of a blur in the acquired images. Since compact digital cameras have small image sensors and have a little blur, the size of the areas to be cut can be small. Specifically, the cut-area size for compact digital cameras is preferably about 10 pixels for high-speed processing, about 60 pixels for reduced influence of noise, and more preferably about 15 to 30 pixels when balanced.

Next, the distance acquisition unit 145 performs Fourier transformation on the selected-area images C1 and C2 to transform the images C1 and C2 to frequency domain images F1 and F2 (step S1503). Another transformation method, such as discrete cosine transformation or wavelet transformation, may be used in consideration of the amount of calculation.

Next, the distance acquisition unit 145 compares the two frequency domain images F1 and F2 to detect a characteristic frequency band having an intense spectrum (step S1504). Since the Fourier-transformed images F1 and F2 in the frequency domain have many low-frequency components, direct-current components may be removed, and the logarithm may be taken. Furthermore, since it is generally known that the intensities of the individual frequency components are inversely proportional to a frequency f, the calculated frequency domain images F1 and F2 may be corrected depending on the frequency, for example, by multiplying the result by f. Thus, a simple comparison between values in the frequency domain images allow a characteristic frequency band that exists more to be detected.

Next, the distance acquisition unit 145 creates a filter BF that allows the characteristic frequency band detected in step S1504 to pass through (step S1505).

Next, the distance acquisition unit 145 filters the frequency domain images F1 and F2 with the filter BF to obtain filtered frequency domain images F1' and F2' (step S1506).

Next, the distance acquisition unit 145 calculates OTFr on the basis of the images F1' and F2' (step S1507).

[Math. 4]

$$OTF_r = \frac{F1'}{F2'} = \frac{OTF1 \cdot S_S \cdot BF}{OTF2 \cdot S_S \cdot BF} \quad \text{Eq. 4}$$

where $S_s$ is a selected scene.

Next, the distance acquisition unit 145 determines the distance information of the pixels (step S1508). In this embodiment, the distance acquisition unit 145 has a transformation table in advance and transforms the value of OTFr to a distance with reference to the transformation table. The transformation table stores image-acquisition parameters, OTFr values when a frequency domain is given, and distances corresponding to the OTFr values. The transformation table may be functions or may be a precalculated look-up table.

The above process is repeated until the distance is determined for all pixels (step S1509). After the distance is determined for all pixels, the distance acquisition unit 145 outputs the acquired distance information to an image processing unit 147 in association with the image data I1 and I2 (step S1510). In this way, the distance information on the subject is acquired in the camera 140.

The distance-information acquisition process performed in the computer 160 is the same as the above three acquisition processes. The distance acquisition unit 165 performs the same process as that of the distance acquisition unit 105. The distance acquisition unit 166 performs the same process as that of the distance acquisition unit 125. The distance acquisition unit 167 performs the same process as that of the distance acquisition unit 145.

Lastly, the details of image processing performed by the image processing units 106, 126, 146, and 169 based on the distance information will be described. The image processing performed in this embodiment is blurring the background of the subject.

The process of blurring is performed by dividing the area of the subject into a plurality of partial images Pn(x, y) and performing a convolution operation (filtering operation) on the individual divided areas by of a normal distribution function N(i, j), as expressed as Eq. 5. In Eq. 5, the operator "*" represents a two-dimensional convolution operation, and On represents a processed partial image generated by convolution operation on the individual Pn.

[Math. 5]

$$O_n(x,y) = P_n(x,y) * N(i,j) \quad \text{Eq. 5}$$

The normal distribution function N(i, j) is expressed as,

[Math. 6]
$$N(i, j) = \frac{1}{\sqrt{2\pi\sigma^2}} \exp\left(\frac{-(i^2 + j^2)}{2\sigma^2}\right) \quad \text{Eq. 6}$$

where a variable σ is a standard deviation. If σ=0, the normal distribution function N(i, j) is 1.

The standard deviation σ is defined as;

[Math. 7]
$$\sigma = \frac{|d_n|}{f} \quad \text{Eq. 7}$$

where f is an image-processing control parameter, indicating the depth of field of blurred image data. The image-processing control parameter f takes a value Fδ using the F-value of a mounted lens, where δ is a permissible circle of confusion. Value do is a representative defocus amount (a distance from a focal plane) of the partial images Pn. In other words, the effect of the blur increases with an increasing distance from the focal plane.

The function for the convolution operation on the partial images Pn is not limited to the normal distribution function shown in Eq. 6; another distribution function can be used to control the amount of blur. The image processing performed on the partial images Pn is not limited to the blurring process. For example, sharpness adjustment corresponding to the defocus amount dn may be performed on the partial images Pn. Furthermore, for example, contrast, brightness, or color saturation may be changed for each partial image Pn depending on the defocus amount dn.

As described above, this embodiment can acquire distance information on a subject from various kinds of image data and perform image processing based on the distance information.

Although the functions of the individual components of this embodiment are as follows, other components may have the similar functions.

In this embodiment, the distance-acquiring-metadata adding units 108, 128, and 148 and the output units 110, 130, and 150 function as output units that output image data for acquiring distance information and information specifying a procedure for acquiring distance information in association with each other.

The input unit 162 functions as an input unit that inputs image data for deriving distance information and information assonated with the image data and specifying a procedure for deriving distance information.

The procedure selection unit 164 functions as a selection unit that selects at least one from a plurality of procedures on the basis of the information specifying a procedure. The distance acquisition units 165 to 167 function as derivation units that derive distance information from the image data using the selected procedure. The image processing unit 169 functions as a common image processing unit irrespective of the procedure that the acquisition unit uses to derive distance information.

The input unit 162 functions as an input unit that inputs parameters that are associated with the image data and that the derivation unit uses to derive distance information.

The distance acquisition units 165 to 167 function as output units that output the distance information derived from the input image data in association with the input image data.

The procedure selection unit 164 functions as a determination unit that determines whether a procedure corresponding to information specifying a procedure is present.

Second Embodiment

In addition to the process of the first embodiment, a second embodiment inputs image data, from which distance information is acquired and is already processed in a camera, to the computer and performs image processing on the image data using the acquired distance information.

Differences from the first embodiment will be described.

Figure 16:
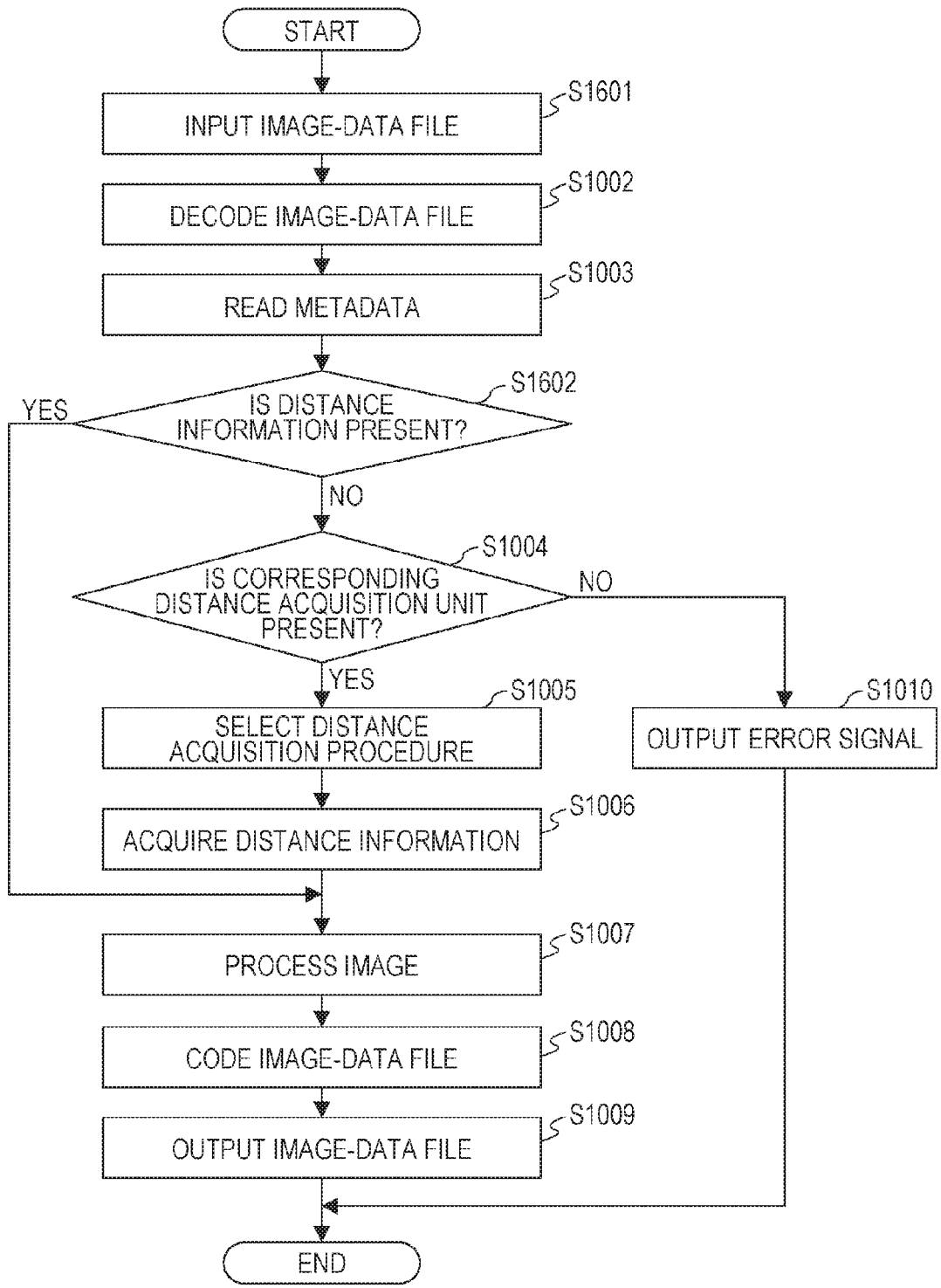
FIG. 16 is a flowchart showing a process performed in a computer of a second embodiment of the present invention.

The configuration of the information processing system of the second embodiment is the same as that in the first embodiment, shown in FIG. 1. However, the ROM in the information processing unit 173 of this embodiment stores a program shown in the flowchart in FIG. 16, and the information processing unit 173 performs a process different from that of the first embodiment. The details of the process will be described hereinbelow. Since steps given the same numerals as in FIG. 10 are the same processes as in the first embodiment, descriptions thereof will be omitted.

First, the input unit 162 receives image-data files 801 for internal and external processing stored in the storage units 111, 131, and 151 via the I/O interface 161 and inputs the files 801 to the decoding unit 163 (step S1601).

Next, the processes in step S1002 and step S1003 are performed. In the second embodiment, it is determined before step S1004 whether the image-data files 801 include distance information from the metadata of the input image data (step S1602). If the input image-data files 801 include distance information, the process goes to step S1007, and image processing is performed using the distance information. If no distance information is included, the process goes to step S1004. In this embodiment, this determination is performed on the basis of the value of Depth Method, another determination criterion, such as Number of Depth Maps, may be used.

The same process as in the first embodiment is performed, and the process ends.

The second embodiment allows distance information acquired in the camera to be used effectively, thus further increasing the flexibility of use of image data.

Third Embodiment

The above embodiments are configured such that a plurality of kinds of image data are input to an external computer, and the computer performs image processing. The third embodiment is configured to perform image processing on image data stored in a camera capable of acquiring image data by a plurality of kinds of image acquisition method.

Figure 17:
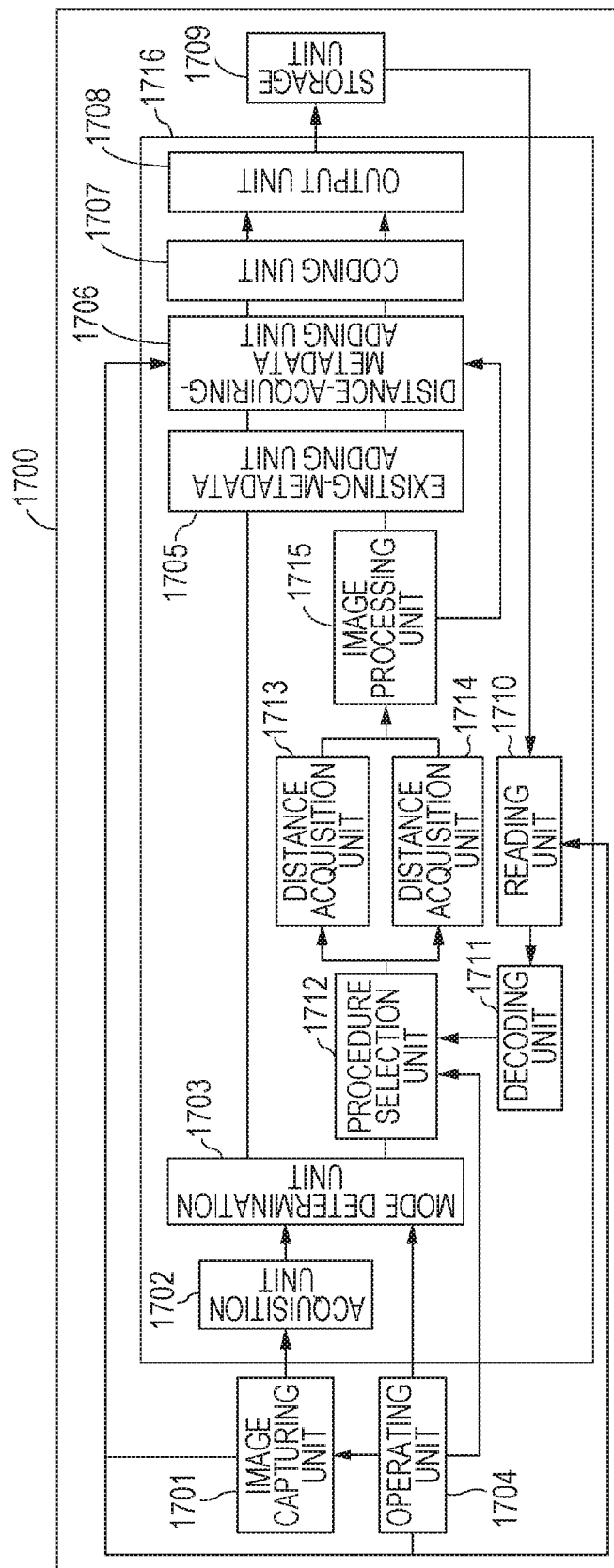
FIG. 17 is a diagram showing the configuration of a camera according to a third embodiment of the present invention.

FIG. 17 is a diagram illustrating the configuration of a camera 1700 of the third embodiment.

The camera 1700 includes an image capturing unit 1701, an operating unit 1704, an information processing unit 1716, and a storage unit 1709.

Figure 18:
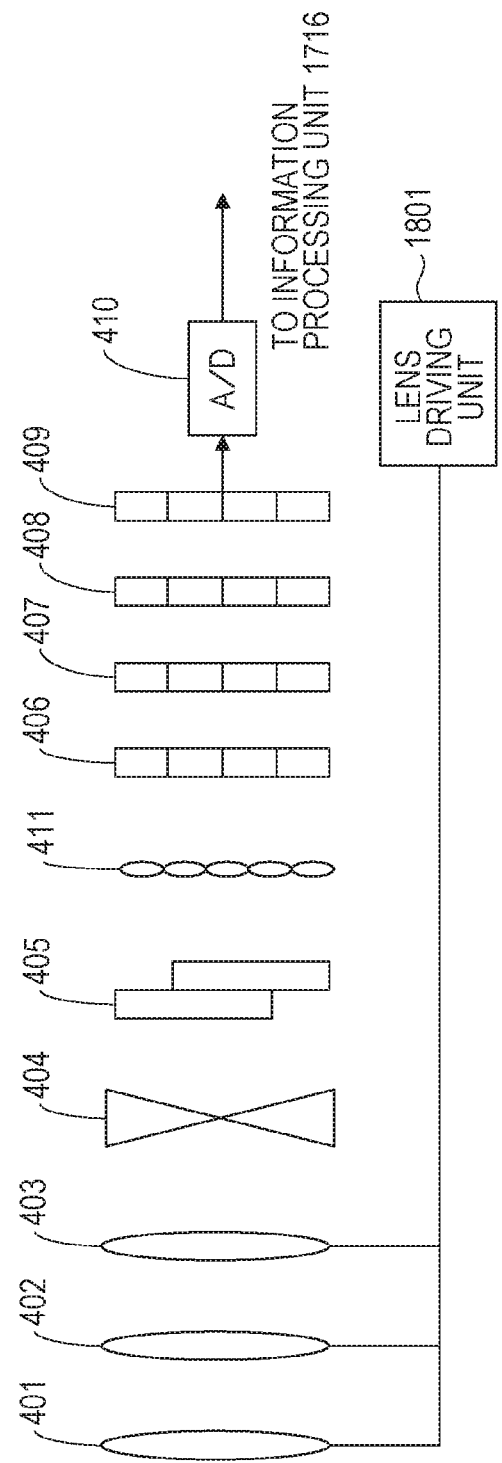
FIG. 18 is a diagram showing an example configuration of an image capturing unit of the camera of the third embodiment.

FIG. 18 is a diagram showing the configuration of the image capturing unit 1701. The image capturing unit 1701 has the configuration of the image capturing unit 121 with the addition of a lens driving unit 1801 and can acquire plenoptic image data and a plurality of items of image data in different in-focus states.

The operating unit 1704 is an input device, such as a button, a dial, or a touch panel provided on the camera main body, with which the user can enter instructions to start or stop image-acquisition, to set conditions for image-acquisition, and so on. In this embodiment, the user can select a mode for image processing based on distance information on the subject, that is, an in-situ processing mode in which image processing is performed in the camera directly after image-acquisition and a post-processing mode in which the image data is stored without image processing until user's instruction is given. The user can select a method for acquiring distance information on the subject, that is, the plenoptic mode in which distance information on the subject is acquired from an item of plenoptic image data and the DFD mode in which distance information on the subject is acquired from two items of image data having different in-focus positions.

Figure 19:
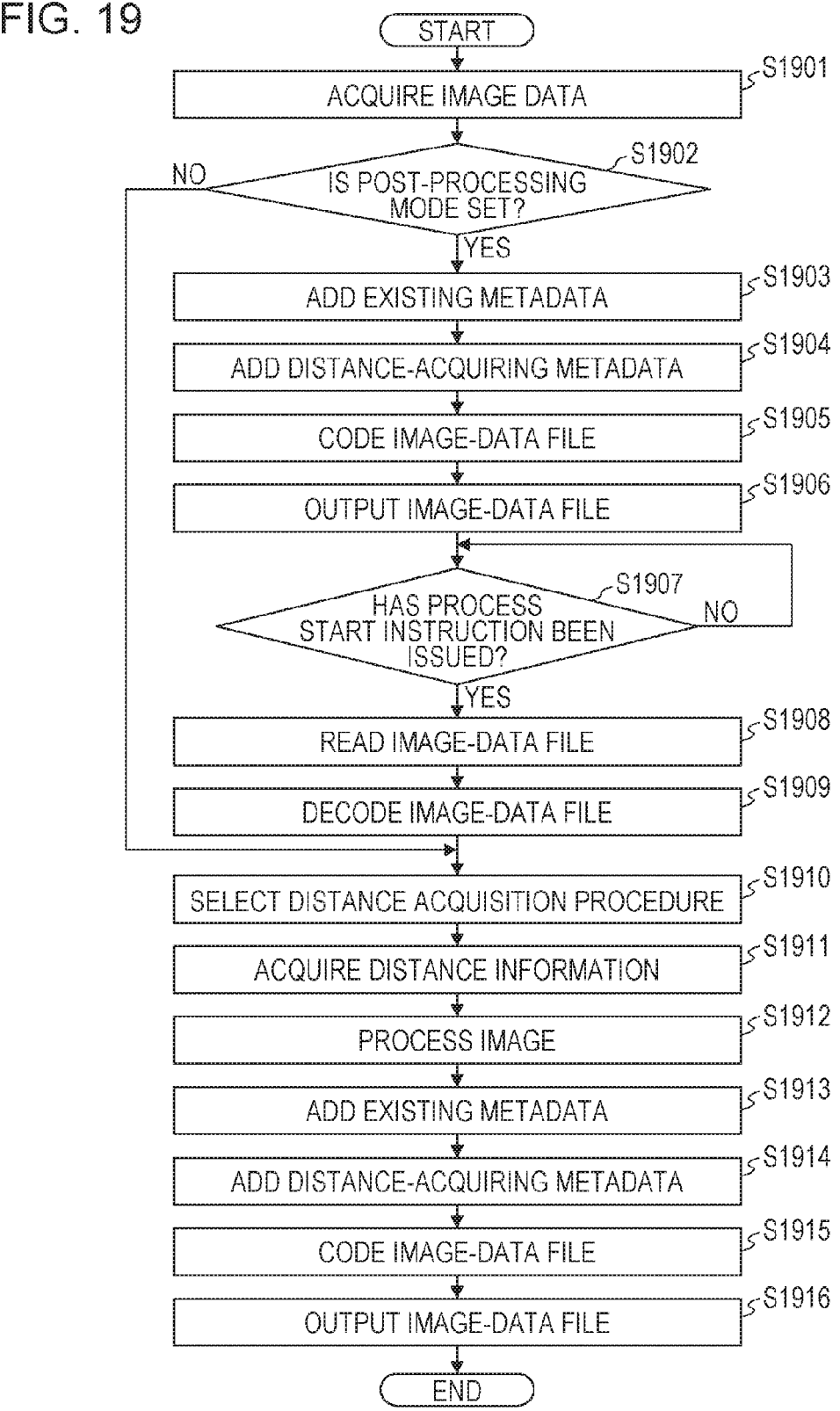
FIG. 19 is a flowchart of a process performed in the camera of the third embodiment.

Although the hardware configuration of the information processing unit 1716 is the same as that of the information processing unit 113, the ROM in the information processing unit 1716 stores a program shown in the flowchart in FIG. 19. The information processing unit 1716 can perform a distance acquisition process based on parallax using plenoptic image data and distance acquisition using the DFD method performed using a plurality of items of image data having different in-focus positions.

The storage unit 1709 is a non-volatile storage medium, such as a memory card.

A process performed in the camera 1700 will be described. FIG. 19 is a flowchart of a process performed in the camera 1700 when a mode for performing image processing based on distance information on acquired image data is set.

First, an acquisition unit 1702 acquires image data output from the image capturing unit 1701 and outputs the image data to a mode determination unit 1703 (step S1901).

Next, the mode determination unit 1703 determines a processing mode set by the operation of the operating unit 1704 (step S1902). If it is determined that the post-processing mode is set, the mode determination unit 1703 outputs the image data to an existing-metadata adding unit 1705 and goes to the process in step S1903. If it is determined that the in-situ processing mode is set, the mode determination unit 1703 outputs the image data to a procedure selection unit 1712 and goes to the process in step S1910.

If it is determined that the post-processing mode is set, the existing-metadata adding unit 1705 adds existing metadata to the input image data and outputs the image data to a distance-acquiring-metadata adding unit 1706 (step S1903). The existing metadata to be added is the same as the existing metadata to be added in the first embodiment.

Next, the distance-acquiring-metadata adding unit 1706 adds the distance-acquiring metadata to the input image data and outputs it to a coding unit 1707 as an image-data file 801 (step S1904). The distance-acquiring metadata to be added is basically the same as in the first embodiment. The value of Depth Method is determined on the basis of the image-acquisition-mode setting instruction of the operating unit 1704. For the plenoptic mode, 2 is input to Depth Method, and for the DFD mode, 3 is input to Depth Method.

The coding unit 1707 codes the input image-data file 801 and outputs the coded input image-data file 801 to an output unit 1708 (step S1905).

The output unit 1708 outputs the coded image-data file 801 to the storage unit 1709 for storage (step S1906).

Next, a reading unit 1710 determines whether a processing start instruction for the image-data file 801 output as post-processing is issued by the operation of the operating unit 1704 (step S1907). If the processing start instruction is issued, the process goes to step S1908, where the process is started.

Next, the reading unit 1710 reads the image-data file 801 output for post-processing from the storage unit 408 and outputs it to a decoding unit 1711 (step S1908).

The decoding unit 1711 decodes the image-data file 801 input from the reading unit 1710 and outputs it to the procedure selection unit 1712 (step S1909).

The procedure selection unit 1712 selects a procedure for use in acquiring distance information on the subject from the input image data (step S1910). If the input image data is acquired in the in-situ processing mode, the procedure selection unit 1712 determines an optimum procedure from the instruction signal output from the operating unit 1704. If the input image data is image data included in the image-data file 801 and acquired in the post-processing mode, the procedure selection unit 1712 determines an optimum procedure from the value of Depth Method included in the image-data file 801. If the value of Depth Method is 2, the procedure selection unit 1712 outputs the image data to a distance acquisition unit 1713. If the value of Depth Method is 3, the procedure selection unit 1712 outputs the image data to a distance acquisition unit 1714.

Next, the distance acquisition unit 1713 or 1714 acquires distance information on the subject using the input image data and outputs the input image data and the acquired distance information in association with each other to an image processing unit 1715 (step S1911). The details of the process is the same as that described in the first embodiment.

Next, the image processing unit 1715 processes the input image data on the basis of a distance map associated with the input image data (step S1912). The details of the process is the same as that described in the first embodiment. The image data generated by image processing is further associated with the input image data and is output to the existing-metadata adding unit 1705.

Next, the existing-metadata adding unit 1705 adds metadata defined in an existing standard file format to the input image data and outputs the image data to the distance-acquiring-metadata adding unit 1706 (step S1913). If the input image data is image data for post-processing, to which existing metadata is added, the image data is output to the distance-acquiring-metadata adding unit 1706 with doing nothing.

Next, the distance-acquiring-metadata adding unit 1706 adds distance-acquiring metadata to the input image data (step S1914). Since the input image data already has distance information, the distance-acquiring-metadata adding unit 1706 inputs 0 to Depth Method and outputs it as the image-data file 801 to the coding unit 1707.

The coding unit 1707 codes the image-data file 801 input from the distance-acquiring-metadata adding unit 1706 and outputs it to the output unit 1708 (step S1915).

The output unit 1708 outputs the input image-data file 801 to the storage unit 1709 for storage, and the process exits (step S1916).

Thus, this embodiment can reduce loads due to the in-situ processing in a camera having a plurality of procedures for acquiring distance information from image data.

Although the functions of the individual components of this embodiment are as follows, other components may have the similar functions.

In this embodiment, the distance-acquiring-metadata adding unit 1706 and the output unit 1708 function as an output unit that outputs image data for acquiring distance information and information specifying a procedure for acquiring distance information in association with each other.

The storage unit 1709 functions as a storage unit for storing an image-data file including the image data and the information specifying a procedure for deriving distance information output from the output unit 1708.

The reading unit 1710 functions as a reading unit that reads the image-data file.

The operating unit 1704 functions as an operation unit with which the user inputs an instruction signal by operation.

The image capturing unit 1701 functions an image acquisition unit that acquires image data by image-acquisition.

Other Embodiments

Embodiments are not limited to the above configurations; alternatively, the present invention may have a configuration in which the above plurality of embodiments are combined, for example, a mode for performing image processing with an external processing unit is added to the third embodiment.

The present invention may be configured as an information processing system having the procedure selection unit, the distance acquisition unit, and the image processing unit as independent processing units.

The process performed using distance information is not limited to the blurring of images but may be 3D modeling of the subject performed by plotting distance information and the two-dimensional coordinates of the image. The acquired distance information may be used for finding a corresponding point in combining multiview images or for measuring the size of an object in the subject.

In the above embodiments, the distance information on the subject is acquired using information on a plurality of different images of the same subject, such as images acquired at different viewpoints or images in different in-focus states; alternatively, the distance acquisition unit may acquire the distance information using another kind of image data. For example, distance information on the subject may be acquired from images acquired by a camera using coded apertures. In this case, the distance information may be of course acquired using a procedure not shown in the above embodiments.

The procedure selection unit may use, not a dedicated parameter (in the above embodiments, Depth Method), but another parameter as information specifying a procedure for acquiring distance information, serving as a determination criterion for selecting a distance acquisition procedure. Examples include the model name of a camera, a file extension, and other parameters included in the existing metadata, or a combination thereof.

Furthermore, the distance acquisition unit may select two or more procedures to acquire distance information from image data. For example, if an image-data file includes a plurality of items of multiview image data acquired at two in-focus positions, the distance acquisition unit may perform both the distance acquisition process based on parallax and the distance acquisition process using the DFD method.

The structure of the image-data file is not limited to that described in the above embodiments. The image-data file may include a new parameter as necessary or does not need to include the above parameters. For example, information on the parallax of a plurality of images may include the base length between individual viewpoints. Information on the difference in in-focus state among a plurality of images may include the f/number of the lens.

A management file including a plurality of items of image data and information corresponding to the CPI data 802 may be output to an identical folder, and the plurality of items of image data in the folder may be managed by the management file. The folder may be compressed and may be output as one file.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-130856, filed Jun. 21, 2013, which is hereby incorporated by reference herein in its entirety.

The invention claimed is:

1. An information processing apparatus including a processor and at least one memory storing computer-executable instructions which, when executed by the processor, causes the apparatus to function as:
    an input unit that inputs image data and information associated with the image data,
        wherein the image data is image data for deriving distance information and the information associated with the image data is information specifying a procedure for deriving distance information, and
        wherein the input unit further inputs a parameter associated with the image data, the parameter being used when the derivation unit derives distance information;
    a selection unit that selects at least one from a plurality of procedures for deriving distance information on the basis of the information specifying a procedure; and
    a derivation unit that derives distance information from the image data using a procedure selected by the selection unit;
    a determination unit that determines whether a procedure corresponding to the information specifying a procedure is present or not;
    a distance output unit that outputs the derived distance information in association with the image data; and
    a processing unit that performs image processing on the image data based on the distance information derived by the derivation unit.

2. The information processing apparatus according to claim 1, wherein the parameter includes information on parallax of a plurality of images.

3. The information processing apparatus according to claim 1, wherein the parameter includes information on a difference in in-focus state among a plurality of images.

4. The information processing apparatus according to claim 1, wherein the image processing is performed by a common processing unit irrespective of a procedure that the derivation unit uses to acquire distance information.

5. The information processing apparatus according to claim 1, wherein the derivation unit selects a procedure for use in deriving distance information on the basis of a table showing the correspondence relationship between the information specifying a procedure and procedures.

6. The information processing apparatus according to claim 1, wherein if a procedure corresponding to the information specifying a procedure is not present, an error signal is output.

7. The information processing apparatus according to claim 1, wherein the image data includes information on a plurality of images of an identical subject in different views.

8. The information processing apparatus according to claim 7, wherein the plurality of procedures include a procedure for deriving the distance information on the basis of a difference in in-focus state among the plurality of images.

9. The information processing apparatus according to claim 7, wherein the plurality of procedures include a procedure for deriving the distance information on the basis of parallax of the plurality of images.

10. The information processing apparatus according to claim 1, wherein the distance information is a distance map showing distances to a plurality of positions in a subject.

11. An information processing apparatus including a processor and at least one memory storing computer-executable instructions which, when executed by the processor, causes the apparatus to function as:
an acquisition unit that acquires image data for deriving distance information;
an output unit that outputs the image data for deriving distance information and information specifying a procedure for deriving distance information in association with each other;
a storage unit that stores the image data and the information specifying a procedure, the image data and the information being output by the output unit;
a reading unit that reads the image data and the information specifying a procedure, the image data and the information being stored in the storage unit; and
a selection unit that selects at least one from a plurality of procedures on the basis of the information specifying a procedure and acquires distance information from the image data using the selected procedure,
wherein the information specifying a procedure is used when at least one is selected from a plurality of procedures, and when distance information is acquired from the image data using the selected procedure,
wherein the image data includes a plurality of items of image data, and
wherein the output unit outputs the image data further in association with information indicating image data for use in deriving distance information among the plurality of items of image data.

12. The information processing apparatus according to claim 11, wherein the output unit groups the plurality of items of image data into a plurality of viewpoint groups based on viewpoints of image-acquisition, associates information indicating viewpoint positions with the individual viewpoint groups, assigns image numbers to the image data included in the individual viewpoint groups, and outputs the image data.

13. The information processing apparatus according to claim 12, wherein the output unit outputs the image data included in the viewpoint groups in association with information indicating in-focus states thereof.

14. The information processing apparatus according to claim 11, further comprising:
an operation unit that inputs an instruction signal by operation,
wherein the reading unit reads the image data and the information specifying a procedure on the basis of an instruction signal input from the operation unit.

15. The information processing apparatus according to claim 11, further comprising an image acquisition unit that acquires image data by image-acquisition.

16. A method for processing information implemented by an information processing apparatus including a processor and at least one memory storing computer-executable instructions which, when executed by the processor, causes the apparatus to perform the method comprising the steps of:
inputting image data and information associated with the image data,
wherein the image data is image data for deriving distance information and the information associated with the image data is information specifying a procedure for deriving distance information, and
wherein the input unit further inputs a parameter associated with the image data, the parameter being used when the derivation unit derives distance information;
selecting at least one procedure from a plurality of procedures for deriving distance information on the basis of the information specifying a procedure;
deriving distance information from the image data using the selected;
determining whether a procedure corresponding to the information specifying a procedure is present or not;
outputting the derived distance information in association with the image data; and
performing image processing on the image data based on the derived distance information.

17. A non-transitory computer readable medium storing a program causing a computer to execute the method according to claim 16.

18. A method for processing information implemented by an information processing apparatus including a processor and at least one memory storing computer-executable instructions which, when executed by the processor, causes the apparatus to perform the method comprising the steps of:
acquiring image data for deriving distance information;
outputting the image data for deriving distance information and information specifying a procedure for deriving distance information in association with each other;
storing the image data and the information specifying a procedure, the image data and the information being output by the output unit;
reading the image data and the information specifying a procedure, the image data and the information being stored in the storage unit; and
selecting at least one from a plurality of procedures on the basis of the information specifying a procedure and acquires distance information from the image data using the selected procedure,
wherein the information specifying a procedure is used when at least one procedure is selected from a plurality of procedures, and when distance information is derived from the image data using the selected procedure, wherein the image data includes a plurality of items of image data, and wherein the outputting outputs the image data further in association with information indicating image data for use in deriving distance information among the plurality of items of image data.

19. A non-transitory computer readable medium storing a program causing a computer to execute the method according to claim 18.

20. An information processing apparatus including a processor and at least one memory storing computer-executable instructions which, when executed by the processor, causes the apparatus to function as:
   an input unit that inputs image data and information associated with the image data,
      wherein the image data is image data for deriving distance information and the information associated with the image data is information specifying a procedure for deriving distance information,
      wherein the input unit further inputs a parameter associated with the image data, the parameter being used when the derivation unit derives distance information, and
      wherein the parameter includes information on a difference in in-focus state among a plurality of images;
   a selection unit that selects at least one from a plurality of procedures for deriving distance information on the basis of the information specifying a procedure; and
   a derivation unit that derives distance information from the image data using a procedure selected by the selection unit.

21. An information processing apparatus including a processor and at least one memory storing computer-executable instructions which, when executed by the processor, causes the apparatus to function as:
   an acquisition unit that acquires image data for deriving distance information; and
   an output unit that outputs the image data for deriving distance information and information specifying a procedure for deriving distance information in association with each other,
   wherein the information specifying a procedure is used when at least one is selected from a plurality of procedures, and when distance information is acquired from the image data using the selected procedure,
   wherein the image data includes a plurality of items of image data, and
   wherein the output unit groups the plurality of items of image data into a plurality of viewpoint groups based on viewpoints of image-acquisition, associates information indicating viewpoint positions with the individual viewpoint groups, assigns image numbers to the image data included in the individual viewpoint groups, and outputs the image data.

* * * * *